US012710880B2

(12) United States Patent
Bruce et al.

(10) Patent No.: US 12,710,880 B2
(45) Date of Patent: Aug. 18, 2026

(54) REDUNDANT ARRAY OF INDEPENDENT SERVERS

(71) Applicant: Deeply Human, Inc., Austin, TX (US)

(72) Inventors: Julian L. Bruce, Austin, TX (US); Roderick Sagabaen, Manila (PH); Nepomuceno Franco, II, Manila (PH); Ricardo H. Bruce, Austin, TX (US); Naresh K. Sehgal, Santa Clara, CA (US); Rey H. Bruce, Austin, TX (US); Lawrence Moldez Salazar, Manila (PH); Madhukar Tallam, Fremont, CA (US)

(73) Assignee: Deeply Human, Inc., Austin, TX (US)

( * ) Notice: Subject to any disclaimer, the term of this patent is extended or adjusted under 35 U.S.C. 154(b) by 0 days.

(21) Appl. No.: 19/067,780

(22) Filed: Feb. 28, 2025

(65) Prior Publication Data

US 2025/0278197 A1 Sep. 4, 2025

Related U.S. Application Data

(60) Provisional application No. 63/560,592, filed on Mar. 1, 2024.

(51) Int. Cl.
*G06F 3/06* (2006.01)
*G06F 11/10* (2006.01)

(52) U.S. Cl.
CPC .......... *G06F 3/0614* (2013.01); *G06F 3/0659* (2013.01); *G06F 3/0689* (2013.01); *G06F 11/1076* (2013.01)

(58) Field of Classification Search
CPC ............. G06F 11/1076; G06F 11/1084; G06F 11/1088; G06F 11/1092; G06F 11/2094; G06F 3/0689
See application file for complete search history.

(56) References Cited

U.S. PATENT DOCUMENTS

| | | | | |
|---|---|---|---|---|
| 9,081,828 B1 * | 7/2015 | Martin | ................ | G06F 11/0727 |
| 2002/0194526 A1 * | 12/2002 | Ulrich | ................ | G06F 11/1076 |
| | | | | 714/E11.034 |

(Continued)

OTHER PUBLICATIONS

Anonymous: "Atomic Server Alternatives: Top 3 CMS Tools & Similar Apps: AlternativeTo", Oct. 26, 2023 (Oct. 26, 2023), pp. 1-4, XP093274863, Retrieved from the Internet: URL:https://alternativeto.net/software/aatomic-server/[retrieved on May 7, 2025].

(Continued)

*Primary Examiner* — Yolanda L Wilson
(74) *Attorney, Agent, or Firm* — Foley & Lardner LLP

(57) ABSTRACT

Various examples, systems, controllers, and methods are disclosed relating to distributed redundant storage across systems in a RAIS environment. Some systems can include a local array of drives configured to store data blocks and at least one configuration data structure including at least one mapping function for at least one logical block address. Some systems can include processing circuitry configured to perform a plurality of first operations to maintain distributed redundancy across a plurality of the systems and perform a plurality of second operations on the data blocks mapped to the local array of drives or remote data blocks on at least one remote array of drives of at least one remote system. The system and the remote system can share a distributed data mapping of the data blocks and share a distributed parity mapping of parity blocks and remote parity blocks.

16 Claims, 15 Drawing Sheets

(56) References Cited

U.S. PATENT DOCUMENTS

| | | | | |
|---|---|---|---|---|
| 2006/0107096 | A1 | 5/2006 | Findleton et al. | |
| 2012/0041992 | A1 | 2/2012 | Sutardja | |
| 2018/0024964 | A1* | 1/2018 | Mao | H04L 67/1097 711/173 |
| 2018/0357127 | A1* | 12/2018 | Akutsu | G06F 3/0619 |
| 2019/0087129 | A1* | 3/2019 | You | G06F 12/0607 |
| 2021/0034485 | A1* | 2/2021 | Danilov | G06F 11/2094 |
| 2023/0195444 | A1* | 6/2023 | Vohra | G06F 9/455 717/172 |

OTHER PUBLICATIONS

International Search Report and Written Opinion on PCT/US2025/018007 dtd Aug. 1, 2025.

* cited by examiner

| Ctl Local Addr | IAS 0 | IAS 1 | IAS 2 | IAS 3 | IAS 4 |
|---|---|---|---|---|---|
| 0 | R0 | B0 | B1 | B2 | B3 |
| 1 | B4 | R1 | B5 | B6 | B7 |
| 2 | B8 | B9 | R2 | B10 | B11 |
| 3 | B12 | B13 | B14 | R3 | B15 |
| 4 | B16 | B17 | B18 | B19 | R4 |
| 5 | R5 | B20 | B21 | B22 | B23 |
| 6 | B24 | R6 | B25 | B26 | B27 |
| 7 | B28 | B29 | R7 | B30 | B31 |
| 8 | B32 | B33 | B34 | R8 | B35 |
| 9 | B36 | B37 | B38 | B39 | R9 |
| • • • | • • • | • • • | • • • | • • • | • • • |
| N | R(N) | | | | |
| N+1 | | R(N+1) | | | |
| N+2 | | | R(N+2) | | |
| N+3 | | | | R(N+3) | |
| N+4 | | | | | R(N+4) |

1500

Stripe Count
Y = 5

| Ctl Local Addr | IAS 0 | IAS 1 | IAS 2 | IAS 3 | IAS 4 |
|---|---|---|---|---|---|
| 0 | SB0 : R0 | SB1 : B0 | SB2 : B1 | SB3 : B2 | SB4 : B3 |
| 1 | SB5 : B4 | SB6 : R1 | SB7 : B5 | SB7 : B6 | SB9 : B7 |
| 2 | SB10 : B8 | SB11 : B9 | SB12 : R2 | SB13 : B10 | SB14 : B11 |
| 3 | SB15 : B12 | SB16 : B13 | SB17 : B14 | SB18 : R3 | SB19 : B15 |
| 4 | SB20 : B16 | SB21 : B17 | SB22 : B18 | SB23 : B19 | SB24 : R4 |
| 5 | SB25 : R5 | SB26 : B20 | SB27 : B21 | SB28 : B22 | SB29 : B23 |
| 6 | SB30 : B24 | SB31 : R6 | SB32 : B25 | SB33 : B26 | SB34 : B27 |
| 7 | SB35 : B28 | SB36 : B29 | SB37 : R7 | SB38 : B30 | SB39 : B31 |
| 8 | SB40 : B32 | SB41 : B33 | SB42 : B34 | SB43 : R8 | SB44 : B35 |
| 9 | SB45 : B36 | SB46 : B37 | SB47 : B38 | SB48 : B39 | SB49 : R9 |
| • • • | • • • | • • • | • • • | • • • | • • • |
| X | SB(X*Y): R(X) | | | | |
| X+1 | | SB(X*Y+1): R(X+1) | | | |
| X+2 | | | SB(X*Y+2): R(X+2) | | |
| X+3 | | | | SB(X*Y+3): R(X+3) | |
| X+4 | | | | | SB(X*Y+4): R(X+4) |

| CTL LOCAL ADDR | IAS 0 | IAS 1 | IAS 2 | IAS 3 | IAS 4 | IAS 5 | IAS 6 | IAS 7 | IAS 8 | IAS 9 |
|---|---|---|---|---|---|---|---|---|---|---|
| 0 | STRIPE 0 | STRIPE 1 | STRIPE 2 | STRIPE 3 | STRIPE 4 | | | | | |
| 1 | SB0 : R0 | SB1 : B0 | SB2 : B1 | SB3 : B2 | SB4 : B3 | | STRIPE 0 | STRIPE 1 | STRIPE 2 | STRIPE 3 |
| 2 | SB5 : B4 | SB6 : R1 | SB7 : B5 | SB8 : B6 | SB9 : B7 | | SB0 : R0 | SB1 : B0 | SB2 : B1 | SB3 : B2 |
| 3 | SB10 : B8 | SB11 : B9 | SB12 : R2 | SB13 : B10 | SB14 : B11 | 1602 | SB4 : B3 | SB5 : R1 | SB6 : B4 | SB7 : B5 |
| 4 | SB15 : B12 | SB16 : B13 | SB17 : B14 | SB18 : R3 | SB19 : B15 | | SB8 : B6 | SB9 : B7 | SB10 : R2 | SB11 : B8 |
| 5 | SB20 : B16 | SB21 : B17 | SB22 : B18 | SB23 : B19 | SB24 : R4 | | SB12 : B9 | SB13 : B10 | SB14 : B11 | SB15 : R3 |
| 6 | SB25 : R5 | SB26 : B20 | SB27 : B21 | SB28 : B22 | SB29 : B23 | | SB25 : R5 | SB26 : B12 | SB27 : B13 | SB28 : B14 |
| 7 | S30 : B24 | SB31 : R6 | SB32 : B25 | SB33 : B26 | SB34 : B27 | 1604 | SB30 : B15 | SB31 : R6 | SB32 : B16 | SB33 : B17 |
| 8 | SB35 : B28 | SB36 : B29 | SB37 : R7 | SB38 : B30 | SB39 : B31 | | SB35 : B18 | SB36 : B19 | SB37 : R7 | SB38 : B20 |
| 9 | SB40 : B32 | SB41 : B33 | SB42 : B34 | SB43 : R8 | SB44 : B35 | | SB40 : B21 | SB41 : B22 | SB42 : B23 | SB43 : R8 |
| 10 | SB45 : B36 | SB46 : B37 | SB47 : B38 | SB48 : B39 | SB49 : R9 | | | RAIS | SET 1 | |
| 11 | | | RAIS SET 0 | | | | | | | |
| 12 | STRIPE 3 | STRIPE 4 | | STRIPE 0 | STRIPE 1 | STRIPE 2 | | STRIPE 0 | STRIPE 1 | STRIPE 2 |
| 13 | SB3 :B2 | SB4 : B3 | | SB0 : R0 | SB1 : B0 | SB2 : B1 | 1606 | SB0 : R0 | SB1 : B0 | SB2 : B1 |
| 14 | SB8 :B6 | SB9 : B7 | | SB3 : B2 | SB4 : R1 | SB5 : B3 | | SB5 : B4 | SB6 : R1 | SB7 : B5 |
| 15 | SB13 :B10 | SB14 : B11 | 1608 | SB6 : B4 | SB7 : B5 | SB8 : R2 | | SB10 : B8 | SB11 : B9 | SB12 : R2 |
| 16 | SB18 : R3 | SB19 : B15 | | SB9 : R3 | SB10 : B6 | SB11 : B7 | | SB15 : B12 | SB16 : B13 | SB17 : B14 |
| 17 | SB23 : B19 | SB24 : R4 | | S12 : B8 | SB13 : R4 | SB13 : B9 | | SB20 : B16 | SB21 : B17 | SB22 : B18 |
| 18 | SB28 : B22 | SB29 : B23 | | SB15 : B10 | SB16 : B11 | SB17 : R5 | | SB25 : R5 | SB26 : B20 | SB27 : B21 |
| 19 | SB33 : B26 | SB34 : B27 | | SB18 : R6 | SB19 : B12 | SB20 : B13 | 1608 | S30 : B24 | SB31 : R6 | SB32 : B25 |
| 20 | SB38 : B30 | SB39 : B31 | | S21 : B14 | SB22 : R7 | S23 : B15 | | SB35 : B28 | SB36 : B29 | SB37 : R7 |
| 21 | SB43 : R8 | SB44 : B35 | | SB24 : B16 | SB25 : B17 | SB26 : R8 | | SB40 : B32 | SB41 : B33 | SB42 : B34 |
| 22 | SB48 : B39 | SB49 : R9 | | | RAIS SET 2 | | | SB45 : B36 | SB46 : B37 | SB47 : B38 |
| 23 | ... RAIS SET 3 (CONT'D) | | | | | | | | RAIS SET 3.. | |

FIG. 16

REDUNDANT ARRAY OF INDEPENDENT SERVERS

CROSS-REFERENCE TO RELATED PATENT APPLICATIONS

The present application claims the benefit of U.S. Provisional Patent Application No. 63/560,592, filed Mar. 1, 2024, the disclosure of which is incorporated herein by reference in its entirety.

TECHNICAL FIELD

The present disclosure generally relates to systems, methods, and non-transitory processor-readable media for distributed data storage and processing using a redundant array of independent servers (RAIS).

BACKGROUND

Data storage systems often utilize redundancy mechanisms to enhance fault tolerance and maintain data integrity in the event of hardware failures. Traditional Redundant Array of Independent Disks (RAID) architectures provide redundancy by striping data across multiple storage devices and incorporating parity-based error correction. RAID implementations typically rely on a centralized RAID controller to manage data distribution, parity computations, and/or recovery processes. While RAID improves data reliability, it introduces a single point of failure due to the reliance on a centralized controller.

SUMMARY

Some implementations relate to an integrated atomic server (IAS) system. The IAS system includes a local array of drives configured to store a plurality of data blocks and at least one configuration data structure including at least one mapping function for at least one logical block address. The IAS system includes processing circuitry configured to perform a plurality of first operations to maintain distributed redundancy across a plurality of the IAS systems and perform a plurality of second operations on the plurality of data blocks mapped to the local array of drives or a plurality of remote data blocks on at least one remote array of drives of at least one remote IAS system. In some implementations, the IAS system and the remote IAS system share a distributed data mapping of the plurality of data blocks and the plurality of remote data blocks. In some implementations, the IAS system and the remote IAS system share a distributed parity mapping of a plurality of parity blocks and a plurality of remote parity blocks.

In some implementations, the processing circuitry is further configured to read at least one data block of the plurality of data blocks mapped to the local array of drives based on the at least one mapping function to determine a physical address and retrieve the at least one data block. In some implementations, the read is at least one of the plurality of second operations.

In some implementations, the processing circuitry is further configured to read at least one remote data block of the plurality of remote data blocks on the at least one remote array of drives of the remote IAS system by transmitting a read command to the at least one remote IAS system, receiving the at least one remote data block in response, and forwarding the at least one remote data block to a requesting application.

In some implementations, the processing circuitry is further configured to write new data to at least one of the plurality of data blocks mapped to the local array of drives by reading an old data block of the plurality of data blocks mapped to the local array of drives, performing an operation on the old data block with the new data to determine a partial parity block, and writing the new data to the local array of drives. In some implementations, the writing is at least one of the plurality of second operations and is based on the distributed parity mapping of the plurality of parity blocks.

In some implementations, the processing circuitry is further configured to write new data to at least one of the plurality of remote data blocks on the at least one remote array of drives of the at least one remote IAS system by transmitting the new data to the at least one remote IAS system, receiving a partial parity block determined by the at least one remote IAs system, and performing an operation with an old parity block of the plurality of parity blocks to generate a new parity block. In some implementations, the operation is at least one of the plurality of first operations and is performed based on the distributed data mapping of the plurality of data blocks and the plurality of remote data blocks and the distributed parity mapping of the plurality of parity blocks and the plurality of remote parity blocks.

In some implementations, the processing circuitry is further configured to perform data recovery by identifying a plurality of addresses for a plurality of lost data blocks of the plurality of data blocks mapped to the local array of drives or the plurality of remote data blocks on the at least one remote array of drives of the at least one remote IAS system and corresponding plurality of parity blocks of the plurality of parity blocks and the plurality of remote parity blocks using the at least one mapping function, generating a plurality of read commands for the plurality of addresses, receiving a plurality of read data blocks, performing a plurality of operations to reconstruct the plurality of lost data blocks using the plurality of parity blocks and the plurality of read data blocks, and remapping the reconstructed plurality of lost data blocks to a plurality of blocks in the local array of drives. In some implementations, the plurality of operations are performed based on the distributed data mapping of the plurality of data blocks and the plurality of remote data blocks and the distributed parity mapping of the plurality of parity blocks and the plurality of remote parity blocks.

In some implementations, the processing circuitry is further configured to maintain at least one command queue including a plurality of priority levels, and to perform a plurality of commands in parallel when writing or reading one of the plurality of data blocks mapped to the local array of drives or one of the plurality of remote data blocks on the at least one remote array of drives of the at least one remote IAS system.

In some implementations, the processing circuitry is further configured to determine or update at least one distributed parity block of the plurality of parity blocks and the plurality of remote parity blocks corresponding with one of the plurality of data blocks mapped to the local array of drives or one of the plurality of remote data blocks on the at least one remote array of drives of the at least one remote IAS system. In some implementations, the determination or update is at least one of the plurality of first operations. In some implementations, the at least one distributed parity block is stored in one of the plurality of the IAS systems based on the distributed parity mapping of the plurality of parity blocks and the plurality of remote parity blocks.

In some implementations, the IAS system is one of a plurality of the IAS systems of a first data group of a plurality of data groups of a redundant array of independent servers (RAIS).

Some implementations relate to a first integrated atomic server (IAS). The first IAS includes at least one storage device configured to store a plurality of data blocks, a plurality of parity blocks, parity data, and configuration data. The first IAS includes at least one processing system configured to perform a plurality of parity operations based on the parity data and perform a plurality of redundant array of independent servers (RAIS) operations based on the configuration data. The first IAS includes at least one network interface configured to transmit and receive a plurality of data blocks to and from at least one second IAS.

In some implementations, the plurality of RAIS operations includes at least storing the plurality of data blocks in the at least one storage device and striping a portion of the plurality of data blocks across the at least one second IAS.

In some implementations, the plurality of RAIS operations include at least performing data recovery based on reconstructing at least one missing data block using the plurality of parity blocks and executing distributed parity computations in parallel with the at least one second IAS.

In some implementations, the plurality of parity includes at least determining the plurality of parity blocks for a portion of the plurality of data blocks striped across the at least one second IAS.

In some implementations, the configuration data includes a plurality of instructions for mapping at least one logical block address (LBA) to at least one location in the at least one storage device or the second IAS.

In some implementations, the parity data includes a plurality of data structures includes a plurality of parity block locations, a plurality of redundancy levels, a plurality of error correction parameters, and a plurality of instructions for reconstructing at least one missing data block using distributed parity computations across the first IAS and the second IAS.

In some implementations, the first IAS is one of a plurality of IASs of a first data group of a plurality of data groups of a RAIS.

Some implementations relate to a system. The system includes one or more processing circuits configured to store a plurality of data blocks and a plurality of parity blocks across a plurality of storage block addresses (SBAs) in a local storage and in a remote storage of at least one remote IAS system based on a mapping function. In some implementations, each RAIS set of a plurality of RAIS sets includes a plurality of stripes, each stripe of the plurality of stripes includes a portion of the plurality of data blocks and at least one of the plurality of parity blocks. In some implementations, storing is performed based on a distributed data mapping of the plurality of data blocks and a distributed parity mapping of the plurality of parity blocks. The one or more processing circuits are configured to perform a plurality of operations (i) to maintain distributed redundancy on the stored plurality of data blocks and the stored plurality of parity blocks to maintain distributed redundancy across a plurality of the IAS systems, or (ii) on the stored plurality of data blocks mapped to the at least one local storage or on the stored plurality of remote data blocks on the at least one remote storage of the at least one remote IAS system.

In some implementations, the one or more processing circuits are further configured to allocate a plurality of spare storage block addresses within the local storage and the remote storage, and to remap at least one of the plurality of data blocks to a spare storage block address responsive to detecting a failure in an original storage block address. In some implementations, the remapping is performed based on the distributed data mapping of the plurality of data blocks.

In some implementations, the one or more processing circuits are further configured to maintain at least one distributed metadata structure including a plurality of entries identifying a relationship between the plurality of data blocks, the plurality of parity blocks, and a plurality of corresponding SBAs in the local storage and the remote storage. In some implementations, at least one of the plurality of operations performed by the one or more processing circuits includes updating the at least one distributed metadata structure based on at least one update in the stored plurality of data blocks.

In some implementations, the one or more processing circuits are further configured to perform at least one recovery operation by retrieving a plurality of surviving data blocks and at least one parity block from the local storage or the remote storage, performing an operation between the plurality of surviving data blocks and the at least one parity block to reconstruct at least one missing data block, and writing the reconstructed at least one missing data block to a SBA determined based on the distributed data mapping of the plurality of data blocks.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements. The present systems and methods for distributed data storage and redundancy management in a redundant array of independent servers (RAIS) system are described in detail below with reference to the attached drawing figures, wherein:

FIG. 15 is a block diagram illustrating an example of mapping logical block addresses (LBAs) to storage block addresses (SBAs) across multiple IAS systems in a RAIS set, according to some implementations;

FIG. 16 is a block diagram illustrating the mapping of data blocks and parity blocks across multiple IAS systems, depicting the relationship between multiple RAIS sets and stripe configurations, according to some implementations.

Figure 1:
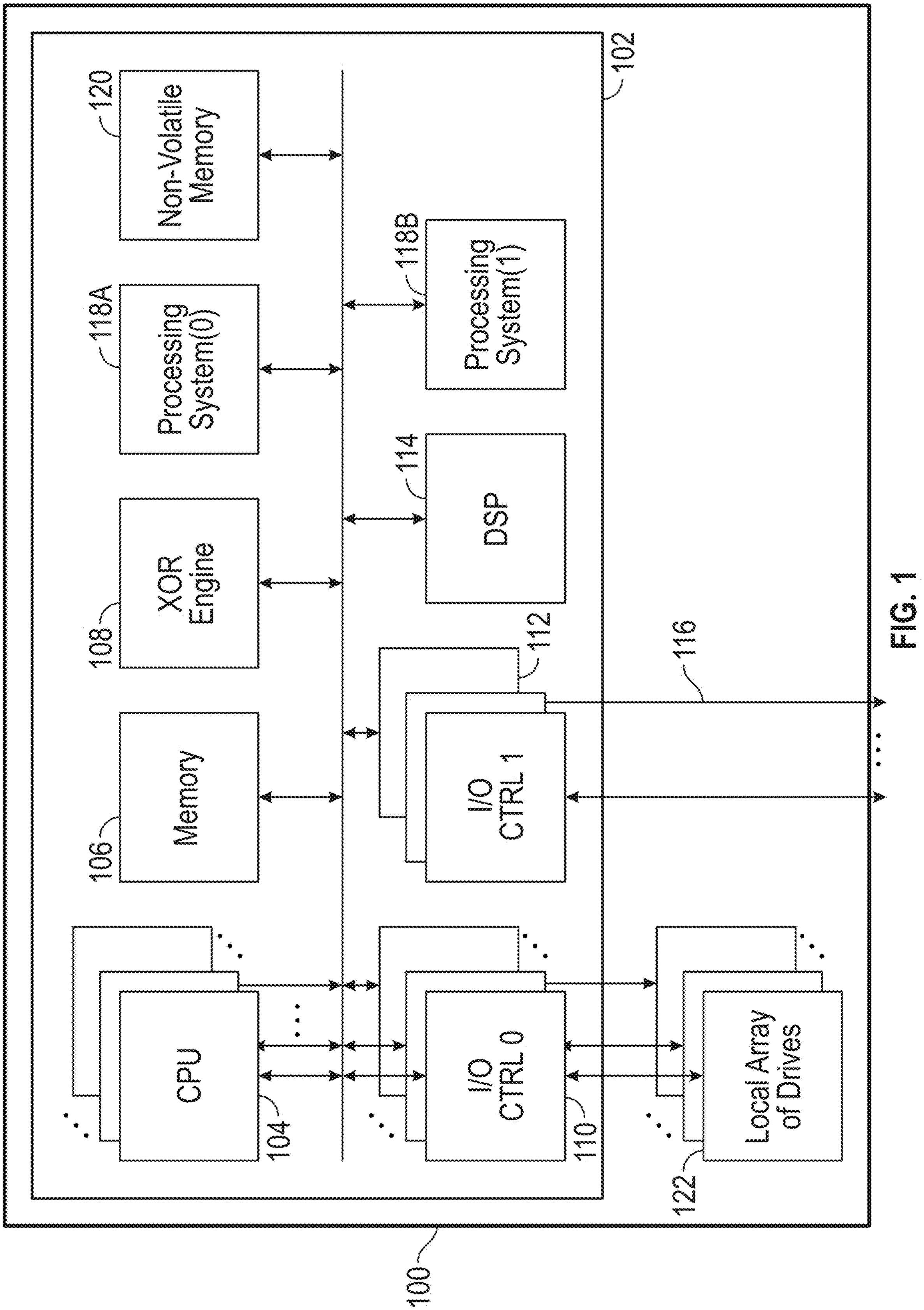
FIG. 1 is an integrated atomic server (IAS) system, according to some implementations.

It will be recognized that some or all the figures are schematic representations for purposes of illustration. The figures are provided for the purpose of illustrating one or more implementations with the explicit understanding that they will not be used to limit the scope or the meaning the claims.

DETAILED DESCRIPTION

Referring generally to the FIGURES, the systems and methods relate generally to distributed data storage and redundancy management in a redundant array of independent servers (RAIS). In some implementations, the system includes a plurality of integrated atomic servers (IAS) configured to store data blocks and parity blocks across multiple distributed storage locations. The IAS system can reduce and/or eliminate the need for a centralized RAID controller by distributing parity computation, redundancy management, and/or data recovery across multiple independent computing nodes. At least one (e.g., each) IAS can include dedicated processing circuits to execute operations for maintaining distributed redundancy and/or performing data storage and retrieval based on a distributed mapping function.

Generally, RAID can be implemented on non-volatile memory devices to achieve protection from drive failures, but traditional RAID configurations rely on a centralized RAID controller, creating a single point of failure and scalability constraints. In contrast, RAIS distributes data storage, redundancy, and/or parity computation across a plurality of the IAS systems, eliminating and/or reducing centralized bottlenecks and increasing fault tolerance. At least one (e.g., each) IAS system can function both as a storage node and a processing node, facilitating parallelized data processing, distributed parity computations, and/or dynamic data recovery across IAS systems.

In many distributed storage architectures, conventional RAID controllers act as a single point of control for striping, parity calculations, and data recovery. However, centralized RAID controllers introduce performance bottlenecks and single points of failure, limiting scalability and increasing system downtime in case of failure. Unlike traditional RAID, the disclosed system distributes parity computations and data recovery processes among multiple independent IAS units, eliminating and/or reducing reliance on a single controller. The system also facilitates parallelized read and write operations across multiple IAS systems, supporting concurrent data transactions without the constraints of centralized RAID architectures.

Accordingly, the present disclosure is directed to systems and methods for distributed data storage and parity computation in a RAIS system. That is, implementing distributed redundancy and data striping across multiple IAS systems improves fault tolerance and data availability by eliminating and/or reducing reliance on a single RAID controller. That is, a distributed mapping function can be implemented that assigns LBAs to IAS storage locations and distributes parity computations across multiple IAS systems. That is, the system can execute parallelized read, write, and/or recovery operations across multiple IAS systems, improving storage efficiency and/or fault tolerance.

The disclosed system improves data integrity, redundancy management, and/or system performance in distributed storage environments. By leveraging RAIS-based striping and redundancy mechanisms, the system eliminates and/or reduces centralized bottlenecks and enhances fault recovery efficiency. This is technically provided by a system architecture that dynamically allocates data blocks and parity blocks across multiple IAS systems based on a distributed mapping function. The system facilitates scalability for large-scale storage deployments, providing an efficient and fault-tolerant improvement to conventional RAID-based storage solutions.

As used herein, "distributed data mapping" and "distributed parity mapping" refer to implementations for allocating logical block addresses (LBAs) to physical storage locations across multiple IAS systems. That is, distributed data mapping defines how the plurality of data blocks and the plurality of remote data blocks are assigned to storage block addresses (SBAs) across multiple IAS systems using a mapping function and the distributed parity mapping defines how the plurality of parity blocks and the plurality of remote parity blocks are positioned across IAS systems based on redundancy and fault-tolerance parameters. For example, distributed data mapping can use an indexed allocation mechanism, where each LBA is translated into an SBA within a distributed storage system. In another example, distributed parity mapping can use an XOR-based encoding process that distributes parity blocks across multiple IAS systems, where at least one (e.g., each) IAS system can be responsible for computing and storing parity for a different subset of data blocks to maintain system-wide redundancy. The system assigns data blocks and parity blocks dynamically across a plurality of the IAS systems based on the mapping function. Each RAIS set includes multiple stripes, where each stripe contains a portion of the data blocks and at least one parity block distributed across multiple IAS systems. One or more IAS systems execute parity calculations and update distributed mappings based on storage system events, such as write operations or system failures, to maintain data integrity.

As used herein, a "mapping function" refers to a computational function executed by an IAS system to translate an LBA into an SBA, determining both the IAS system and the physical storage location where the data block or parity block is stored. That is, the mapping function applies a deterministic computation based on RAIS set parameters, including stripe size, number of the IAS systems, and redundancy levels, to distribute data blocks and/or parity blocks across available storage resources. For example, a mapping function can use a modulo operation to allocate LBAs to IAS systems in a cyclic manner. The mapping function can also use parity placement rules that dictate how parity blocks are assigned to IAS systems, preventing parity data from being stored in the same IAS system as the corresponding data blocks.

As used herein, a "configuration data structure" refers to a structured set of parameters and metadata stored in the storage devices of an IAS system, defining data allocation rules, redundancy schemes, and/or operational constraints for managing distributed storage across multiple IAS systems. That is, the configuration data structure contains attributes such as stripe counts, stripe IDs, RAIS set identifiers, parity update strategies, and/or failover handling procedures, which are used by the IAS system to execute distributed storage operations. For example, a configuration data structure can include an array of index entries that map LBAs to specific IAS systems and corresponding SBAs. The configuration data structure can also store parity computation parameters, indicating how IAS systems interface when performing distributed parity updates during write operations.

As used herein, "data blocks" refer to units of a structured storage that contain portions of files, datasets, or transactional records, which can be assigned to specific SBAs across IAS systems based on distributed data mapping. That is, each data block can be associated with an LBA and can be mapped to an IAS system where it is physically stored in local or remote storage resources. The mapping of data blocks can consider storage efficiency, fault tolerance, and/or parallel access constraints, allowing IAS systems to manage distributed read and write operations efficiently. For example, a data block can correspond to a 4 KB sector within an IAS storage device, where multiple data blocks can be organized into stripes within a RAIS set. Data blocks within the same stripe can be stored in different IAS systems to improve fault tolerance and allow distributed read operations to be performed in parallel.

As used herein, "parity blocks" refer to computed storage units containing error-correcting information derived from a plurality of data blocks, which are allocated to specific SBAs across IAS systems based on distributed parity mapping. That is, each parity block can be generated by applying a parity function (e.g., XOR operation) to a subset of data blocks within a stripe, and the resulting parity block can be stored in a different IAS system than the associated data blocks to facilitate distributed data recovery. The parity block location can be determined based on a parity placement algorithm that accounts for the structure of the RAIS set and the number of participating IAS systems. For example, a parity block can be stored in one or more IAS systems separate from the corresponding data blocks. During write operations, each IAS system can be responsible for parity storage recalculates and updates its parity blocks in parallel with other IAS systems, reducing system-wide latency associated with parity updates.

Referring now to FIG. 1, an integrated atomic server (IAS) system 100 is shown, according to some implementations. FIG. 1 depicts the IAS system 100 within a computing system 102, where the IAS system 100 can interface with at least one remote IAS system (not illustrated) through one or more communication links. The IAS system 100 can be configured to form part of a RAIS environment in which multiple IAS systems exchange signals to read, write, and/or update data blocks and parity blocks across distributed storage resources. For example, at least one (e.g., each) IAS system can transmit read or write commands to retrieve or modify data blocks stored locally or on another IAS system, and/or can generate or update parity blocks for fault tolerance.

In some implementations, the CPU 104 can be configured to decode and execute instruction sets (e.g., scheduling read operations, issuing write commands, managing partial parity updates, and/or any low-level control tasks). That is, the CPU 104 can process incoming signals to coordinate local storage access, remote block retrieval, and/or Processing core(s) invocation. For example, the CPU 104 can dispatch directives to the processing core(s) 108 for parity computation when a data block is updated. Additionally, the CPU 104 can retrieve mapping data from the local array of drives 122 and/or the memory 106 to determine whether a requested data block should be accessed locally or via a remote IAS system. In some implementations, the CPU 104 can interface and/or otherwise communicate with other components of the IAS system 100, for example, the CPU 104 can interface with the local array of drives 122 and/or the memory 106 by exchanging instruction/data signals, the CPU 104 can interface with the processing core(s) 108 by issuing parity computation commands, and/or the CPU 104 can interface with the I/O controller 110 by transmitting read/write control signals.

In some implementations, the IAS system 100 includes at least one processor (CPU) 104 operatively coupled to a memory 106, a local array of drives 122, and/or a communication channel 116. The CPU 104 can decode and execute instructions for orchestrating local storage operations and transmitting or receiving signals over communication channels that link to a remote IAS system. The CPU 104 can interface with additional processing resources (e.g., processing core(s) 108, a digital signal processor (DSP) 114, and/or processing systems 118A, 118B) to handle data-level tasks and parity computations. A dedicated processing core(s) 108 (also referred to herein as an "XOR system") can be coupled to the communication channel 116 to process old data blocks and new data blocks, thus determining updated parity blocks. For example, the CPU 104 can issue instructions to the processing core(s) 108 to compute partial or final parity when performing write operations.

In some implementations, the CPU 104 can be configured to synchronize operations between the processing core(s) 108, the I/O controller 110, and/or the I/O controller 112 (and/or processing system 118A, processing system 118B) to facilitate pipelined execution of storage and/or processing tasks. That is, the CPU 104 can issue sequential instructions to ensure that multiple operations, such as compression, encryption, XOR computation, and storage, can be executed in a coordinated manner without contention. For example, when storing data, the CPU 104 can first instruct the processing core(s) 108 to compress a data block, then initiate an encryption routine before computing a parity block using an XOR operation, and subsequently issue a write command via the I/O controller 110 or I/O controller 112 to store the processed data in the local array of drives 122 or a remote IAS system. Additionally, the CPU 104 can manage instruction dependencies by sequencing operations to prevent bottlenecks in the data pipeline.

In some implementations, the IAS system 100 can execute pipelined data processing operations by distributing tasks across the processing core(s) 108, the I/O controller 110, the I/O controller 112, and/or other processing components. That is, the IAS system 100 can handle sequential operations, such as compression, encryption, parity computation, and/or storage, in a continuous pipeline without CPU 104 intervention. For example, during a write operation, the processing core(s) 108 can compress a data block, forward it for encryption, compute parity using XOR operations, and/or send the processed data to the I/O controller 110 for local storage or to the I/O controller 112 for transmission to a remote IAS system. Similarly, during a read operation, data can be retrieved from the local array of drives 122 or a remote IAS system, decrypted, decompressed, and/or validated before being forwarded to the CPU 104 or another processing component. The IAS system 100 can allocate separate processing channels for different stages of the pipeline, facilitating parallel execution of independent tasks. That is, while one data block undergoes compression, another block can be encrypted, and/or a third block can have its parity updated. In some implementations, the processing core(s) 108 can manage data pipelines dynamically, adjusting the sequence of operations based on workload conditions and system resource availability. Additionally, the communication channel 116 can facilitate data transfers between IAS nodes, maintaining synchronization across distributed pipelined operations.

In some implementations, the CPU 104 can perform and/or otherwise execute retrieval operations that facilitate synchronized execution of decryption, decompression, and/or data validation tasks. That is, when a read request is received, the CPU 104 can identify whether the requested data block is stored locally and/or on a remote IAS system and issue a read instruction to the I/O controller 110 or I/O controller 112 accordingly. Upon retrieval, the CPU 104 can direct the processing core(s) 108 to first decrypt the data block, then apply a decompression routine before forwarding the data for consumption by an application or another system component. For example, if a compressed and encrypted data block is retrieved from the local array of drives 122, the CPU 104 can ensure that the processing core(s) 108 sequentially apply decryption and decompression in a controlled manner before making the data available for use.

Additionally, in some implementations, the CPU 104 can dynamically adjust instruction scheduling based on system conditions (e.g., storage utilization, processing workload, or network congestion) to maintain improved data throughput across the IAS system 100. That is, the CPU 104 can monitor the state of the processing core(s) 108, the I/O controller 110, and/or the I/O controller 112 (and/or processing system 118A, processing system 118B) to determine when to initiate specific processing tasks. For example, if the processing core(s) 108 are executing multiple parity computations, the CPU 104 can queue additional XOR operations until the previous calculations are completed, preventing resource contention. Additionally, if a remote IAS system experiences high network latency, the CPU 104 can delay dependent operations to maintain consistency between local and remote storage updates.

In some implementations, the processing core(s) 108 can execute a RAIS driver (IASD) to manage distributed storage operations, including logical block address (LBA) resolution, parity computations, error correction handling, redundancy enforcement, and/or inter-node data transfers within IAS system 100. The IASD can serve as a low-level execution layer that interacts with the CPU 104, I/O controller 110, I/O controller 112, other processing systems, and/or local array of drives 122 to coordinate data movement, transformation, and/or storage across local and remote IAS systems. That is, the processing core(s) 108 can execute IASD routines to schedule and improve parallel execution of compression, encryption, XOR-based parity calculations, logical-to-physical block mappings, RAID-stripe assignments, and/or fault recovery without CPU 104 intervention. The CPU 104 can interface with the IASD by issuing high-level storage commands, while the IASD translates these commands into low-level execution steps managed by the processing core(s) 108. For example, the CPU 104 can issue a request to store data, which the IASD translates into a sequence of operations such as determining stripe placement, retrieving parity block assignments, invoking compression routines, applying encryption, executing a bitwise XOR operation for parity calculations, issuing a write request to I/O controller 110 or I/O controller 112, updating metadata structures, synchronizing distributed parity mappings, and/or confirming operation status. Additionally, the IASD can reference distributed data and parity mappings stored in memory 106, non-volatile memory 120, and/or the local array of drives 122 to determine storage locations, redundancy levels, and/or error correction parameters. The processing core(s) 108 can execute IASD routines continuously, processing incoming data streams, scheduling data integrity checks, coordinating block remapping, issuing reconstruction tasks upon detecting data loss, managing read-modify-write cycles for parity updates, and/or improving resource allocation across multiple IAS nodes to maintain system-wide data consistency.

In some implementations, the memory 106 can be a volatile or non-volatile storage element configured to store system instructions, data structures, and temporary processing buffers used by the CPU 104, the processing system 118A, the processing system 118B, and the processing core(s) 108. The memory 106 can store intermediate results for parity computations during write operations and retain state information for read, write, and/or recovery processes. The CPU 104 and processing components can access memory 106 to retrieve mapping information, issue data access requests, and execute distributed redundancy operations. The I/O controllers 110 and 112 can interface with memory 106 to cache data blocks before storage or transmission.

In some implementations, the DSP 114 can be configured to perform signal-level processing, including error detection, data integrity verification, and/or other transformations for data handling within the IAS system 100. The DSP 114 can interface with memory 106 to retrieve raw data blocks, apply signal processing operations, and/or store processed results back into memory before transmission via the communication channel 116 or storage in the local array of drives 122. For example, the DSP 114 can analyze incoming data streams to detect anomalies or inconsistencies before they are stored or transmitted. In another example, the DSP 114 can assist with formatting and structuring data blocks for retrieval and/or processing by the CPU 104 and/or the processing core(s) 108. Additionally, the DSP 114 can facilitate data alignment operations.

In some implementations, the non-volatile memory 120 can be configured to store code (e.g., firmware, bootloader programs, low-level system drivers, fault-tolerance routines, and/or any other system management software) and/or base configuration data (e.g., system initialization parameters, storage device mappings, RAID/RAIS configurations, IAS network topology information, and/or any redundancy management settings). That is, the code can include system-level instructions executed by the CPU 104, processing core(s) 108, processing system 118A, and/or processing system 118B to initialize, configure, and manage operations within the IAS system 100. For example, the CPU 104, processing core(s) 108, processing system 118A, and/or processing system 118B can be configured to execute firmware instructions stored in the non-volatile memory 120 during boot sequences, apply system patches or updates, and/or handle error recovery processes based on predefined fault-handling routines. Additionally, the base configuration data can be accessed by processing components to retrieve system-wide settings. That is, base configuration data can define logical-to-physical storage mappings, stripe allocations, and/or communication parameters used by the IAS system 100. For example, the base configuration data can be used by the CPU 104, processing core(s) 108, processing system 118A, and/or processing system 118B to determine parity block locations, configure failover procedures, and/or coordinate distributed redundancy across multiple IAS nodes. In this example, when an IAS system joins or is replaced, it can retrieve its base configuration data from non-volatile memory 120 to synchronize with the existing RAIS environment and restore the correct data allocation structure.

In some implementations, the local array of drives 122 can be a storage element (e.g., SSDs, HDDs, NVMe drives, and/or any other block storage devices) that stores at least one configuration data structure including at least one mapping function for at least one logical block address (LBA) and/or operational metadata for the IAS system 100. The CPU 104 or other processing circuitry (e.g., processing core(s) 108, DSP 114, processing systems 118A, 118B) can reference instructions and mapping parameters in the local array of drives 122 to determine where data blocks and/or parity blocks can be stored (either in the local array of drives 122 or in at least one remote IAS system). For example, the local array of drives 122 can contain indexing tables or parity-distribution rules that specify which IAS system can handle each parity block. Generally, the local array of drives 122 can have one or more dedicated storage devices (e.g., SSDs, HDDs, SSHDs, SATA) to store configuration data structures and/or logs. The dedicated storage devices can be used to provide redundancy by maintaining mirrored copies of system metadata. In some implementations, configuration data can be copied into the memory 106 during initialization. That is, the CPU 104 can load system metadata and mapping functions from the local array of drives 122 into memory 106 at startup, allowing faster access to data structures needed for real-time storage operations and distributed redundancy management.

Additionally, the local array of drives 122 can be configured to store parity data and configuration data (e.g., system firmware, distributed parity mapping details, RAIS set identifiers, and/or any persistent configuration). That is, the local array of drives 122 can maintain RAIS parameters through system reboots and/or power cycles. For example, the local array of drives 122 can contain mirrored parity reference tables so that the IAS system 100 can reconstruct lost blocks even after a reset. Additionally, the local array of drives 122 can keep logs of prior writes and/or error events for debugging or recovery purposes. In some implementations, the local array of drives 122 can interface and/or otherwise communicate with other components of the IAS system 100, for example, the local array of drives 122 can interface with the CPU 104 by providing stored configuration records, the local array of drives 122 can interface with the memory 106 and/or non-volatile memory 120 by synchronizing RAIS mapping data, and/or the local array of drives 122 can interface with the communication channel 116 by exchanging firmware updates.

In some implementations, the local array of drives 122 can be configured to store a configuration data structure (e.g., mapping function parameters, distributed data mapping tables, distributed parity mapping rules, and/or any control metadata). That is, the local array of drives 122 can hold the instructions the CPU 104, processing core(s) 108, processing system 118A, and/or processing system 118B references for read, write, and/or recovery operations. For example, the local array of drives 122 can maintain an index correlating logical block addresses (LBAs) with local or remote physical addresses across IAS systems. Additionally, the local array of drives 122 can temporarily buffer partial parity values and/or queue entries for upcoming I/O tasks. In some implementations, the local array of drives 122 can interface and/or otherwise communicate with other components of the IAS system 100, for example, the local array of drives 122 can interface with the CPU 104 by providing lookup tables, the local array of drives 122 can interface with the processing core(s) 108 by delivering data for signal processing, and/or the local array of drives 122 can interface with the communication channel 116 by receiving or sending address/data transfers.

In some implementations, the IAS system 100 further includes at least one I/O controller 110 providing an interface to a local array of drives 122. At least one I/O controller 112 can provide interfaces to remote systems via the communication channel(s) 116. The local array of drives 122 can be configured to store a plurality of data blocks according to the mapping function. Each I/O controller can exchange status signals (e.g., completion interrupts or error notifications) with the CPU 104 and/or processing core(s) 108. For example, an I/O controller can receive a write command from the CPU 104, determine a physical address in the local array of drives 122, and dispatch the new data block to that location.

In some implementations, the IAS system 100 and a remote IAS system share a distributed data mapping of the plurality of data blocks and the plurality of remote data blocks, as well as a distributed parity mapping of a plurality of parity blocks and a plurality of remote parity blocks. These mappings can be stored in the local array of drives 122, the memory 106, and/or the non-volatile memory 120 (e.g., signals referencing LBAs can be resolved into physical addresses. For example, if a remote data block is requested, the CPU 104 can identify the distributed data mapping to locate which IAS system holds that data and transmit a corresponding read command over the network.

In some implementations, a plurality of first operations can be performed by the CPU 104 or other processing circuitry to maintain distributed redundancy across multiple IAS systems. Such operations can include generating new parity blocks, combining partial parity signals from different IAS systems, and/or applying redundancy protocols if a drive or node is offline. For example, if the CPU 104 detects updated data in the local array of drives 122, it can instruct processing core(s) 108 to compute a partial parity block, then integrate it with the old parity to create an updated parity block consistent with the distributed parity mapping.

In some implementations, a plurality of second operations can be performed on data blocks in the local array of drives 122 and/or on remote data blocks in at least one remote IAS system. The second operations can include reading a locally stored data block, generating a read command for a remote IAS system, and/or writing new data blocks either locally or remotely. For example, if the CPU 104 receives a read request for a data block not present in the local array of drives 122, it can send a read command signal to the remote IAS system determined by the mapping function and forward the retrieved data to the requesting entity.

In some implementations, local reads can occur when the CPU 104 references the mapping function in the local array of drives 122 to identify which physical drive address in the local array of drives 122 (e.g., SSDs, HDDs) corresponds to the requested block. The CPU 104 or I/O controller 110 can then retrieve the block. For example, if the mapping function indicates LBA 100 maps to drive 0 in the local array of drives 122, the I/O controller 110 can access drive 0 at the specified address and return the data to the CPU 104.

In some implementations, remote reads occur when the CPU 104 identifies a data block as residing in a remote IAS system, prompting it to transmit a read command (e.g., by the I/O controller 112) across the communication channel 116. The remote IAS system returns the requested data block, which can then be forwarded to the application or stored in the local array of drives 122. For example, once the CPU 104 receives the remote data, it can store it in a buffer in the local array of drives 122 or stream it directly to a client request handler.

In some implementations, local writes can begin with reading an old data block from the local array of drives 122, generating a partial parity block via processing core(s) 108, and then writing the updated data back to the local array of drives 122. This write can rely on the distributed parity mapping to place and/or update parity blocks. For example, after the processing core(s) 108 calculates partial parity, the CPU 104 can direct the I/O controller 110 to store the updated data block in drive 1 of the local array of drives 122.

In some implementations, writing new data to a remote data block can include transmitting updated data to a remote IAS system, obtaining a partial parity block from that remote system, and generating a new parity block by combining it with the old parity block (e.g., by performing an XOR operation). That is, the old parity block can be bitwise combined (e.g., XORed) with the partial parity block to generate an updated parity value. For example, the CPU 104 can collect an old parity block from the local array of drives 122 and/or the memory 106, merge it with the partial parity received from the remote system, and store the updated parity in a designated location.

In some implementations, data recovery can be triggered upon detecting lost or corrupted data blocks. The CPU 104 and/or the processing core(s) 108 can identify addresses for the lost blocks, reads surviving data blocks and parity blocks (local or remote), and reconstructs missing blocks using the processing core(s) 108 and/or DSP 114. The CPU 104 and/or the processing core(s) 108 can store the reconstructed data in a suitable location in the local array of drives 122. For example, the CPU 104 and/or the processing core(s) 108 can issue read commands for multiple drives, aggregate the data in the local array of drives 122 and/or the memory 106, perform XOR operations to rebuild the lost blocks, and write them to a spare region of the local array of drives 122.

In some implementations, a command queue with multiple priority levels can be maintained by the CPU 104, allowing the IAS system 100 to process read and write operations in parallel. This can include local operations on the local array of drives 122 and/or remote operations in conjunction with another IAS system. For example, the CPU 104 can schedule a high-priority remote read concurrently with a lower-priority local write.

In some implementations, distributed parity blocks can be updated by retrieving the old parity block (e.g., from the local array of drives 122 and/or the local memory 106), generating partial parity from modified data (e.g., by XORing the old data and new data blocks), and computing the new parity block (e.g., by merging the partial parity with the old parity block). The CPU 104 can store the new parity block in an IAS system determined by the mapping function. For example, if the updated parity block must reside in a different IAS system than the data block, the I/O controller 112 can dispatch the block to that external system via the communication channel 116 and associated communication interface.

Generally, the processing core(s) 108 can be implemented as dedicated hardware accelerators, general-purpose processors, digital signal processors (DSPs), field-programmable gate arrays (FPGAs), application-specific integrated circuits (ASICs), and/or any other processing unit optimized for high-performance computing. The processing core(s) 108 can be responsible for executing data processing tasks, handling parity computations, performing error detection and correction, managing compression and decompression, executing encryption and decryption, and/or any specialized computational workload for distributed storage management. That is, while the processing core(s) 108 are described herein as performing operations, compression, decompression, encryption, decryption, logical operations, arithmetic operations, and/or any signal-processing functions, it should be understood that implementations may use different architectures depending on system requirements, workload distribution, and/or performance optimization strategies.

Additionally, the processing core(s) 108 can be configured to perform various logical and/or arithmetic operations (e.g., XOR, AND, OR, INVERT, ADD, SUBTRACT, MULTIPLY, DIVIDE, and/or any bitwise or computational operation used in parity and data transformation). That is, the processing core(s) 108 can execute low-latency computations for distributed parity updates, error correction, and/or redundancy management. For example, the processing core (s) 108 can compute XOR operations for parity calculations when data is modified. In another example, the processing core(s) 108 can perform logical comparisons and bitwise transformations to detect corrupted and/or inconsistent data blocks. Additionally, operations of the processing core(s) 108 can be performed by dedicated co-processors, reconfigurable logic units, and/or auxiliary compute engines integrated into the IAS system. For example, the processing core(s) 108 can offload repetitive arithmetic tasks to specialized hardware units for increased efficiency in high-throughput environments.

Additionally, the processing core(s) 108 can be configured to perform compression (e.g., Huffman coding, run-length encoding (RLE), and/or any lossless or lossy data compression algorithm) and/or decompression (e.g., LZ77, LZ78, and/or any decompression routine used for storage efficiency) on data blocks stored in the local array of drives 122 or transmitted across IAS systems. That is, the processing core(s) 108 can reduce storage and network bandwidth usage by encoding data into a compact format before transmission or storage. For example, the processing core(s) 108 can apply compression techniques to dynamically encode data blocks based on entropy analysis. In another example, the processing core(s) 108 can selectively compress non-parity data blocks, reducing computational overhead on parity-related computations. Additionally, compression by the processing core(s) 108 can be performed by a dedicated compression system integrated into the processing unit and/or through firmware-implemented routines. For example, the processing core(s) 108 can invoke hardware-based encoding functions. Additionally, decompression by the processing core(s) 108 can be performed by decompression hardware or software routines optimized for rapid data retrieval. For example, the processing core(s) 108 can decompress incoming data streams before writing them to memory.

Additionally, the processing core(s) 108 can be configured to perform encryption (e.g., AES-256, RSA, and/or any cryptographic encryption standard) and/or decryption (e.g., AES-GCM, ECC, and/or any decryption method for secure data handling) on data blocks transferred within the RAIS system. That is, the processing core(s) 108 can apply cryptographic transformations to protect data from unauthorized access, providing confidentiality across distributed storage networks. For example, the processing core(s) 108 can encrypt stored data blocks before writing them to the local array of drives 122. In another example, the processing core(s) 108 can apply hardware-accelerated decryption routines to decode incoming data for processing. Additionally, encryption by the processing core(s) 108 can be performed by dedicated cryptographic systems embedded within the processing circuitry. For example, the processing core(s) 108 can utilize AES hardware acceleration to perform real-time data encryption. Additionally, decryption by the processing core(s) 108 can be performed by integrated security processors and/or software-defined cryptographic modules. For example, the processing core(s) 108 can validate digital signatures and decrypt metadata associated with encrypted parity blocks before executing data recovery operations.

In some implementations, the processing core(s) 108 can be configured to execute watchdog monitoring operations to verify the operational status of remote IAS systems within the RAIS environment. That is, each IAS system 100 can implement a watchdog timer that periodically issues heartbeat signals and/or ping requests to other IAS systems over the communication channel 116, even when there are no active data transfers occurring. The processing core(s) 108 can initiate these periodic pings based on a predefined interval and/or monitor response times from each remote IAS system. If a remote IAS system fails to respond within a threshold time period (e.g., 50 ms, 100 ms, 250 ms, 1,000 ms), the processing core(s) 108 can flag the IAS system as unresponsive and trigger a failure detection protocol. In some implementations, the processing core(s) 108 can interface with the CPU 104 to log the failure event in the memory 106 and/or notify the I/O controller 112 to reroute any pending or future storage operations away from the unresponsive IAS system. Additionally, the processing core(s) 108 can initiate redundancy management operations, such as reconstructing any data blocks stored on the failed IAS system using parity blocks stored across the RAIS network.

In some implementations, the IAS system 100 can be one member and/or controller node of a RAIS data group, with multiple IAS systems handle signals for read, write, and/or recovery operations using the same distributed mappings. Each IAS system can store mapping data, parity data, and configuration metadata in the local array of drives 122, the memory 106, and/or the non-volatile memory 120. For example, a system-wide administrator node can distribute initial configuration files so that each IAS system applies the same rules for distributing data and parity.

In some implementations, the IAS system 100 can contain the non-volatile memory 120 that can store parity data and configuration data, and the local array of drives 122 that can store data blocks and parity blocks for redundancy. In some implementations, the IAS system 100 can contain the local array of drives 122 that can store parity data, configuration data, data blocks, and/or parity blocks for redundancy. The CPU 104 or other processing system (e.g., DSP 114, processing core(s) 108) can execute RAIS operations to maintain distributed redundancy, coordinate striping across multiple IAS systems, and/or conduct fault recovery. For example, if one IAS system 100 detects a drive failure, it can invoke a recovery procedure that pulls partial data from other IAS systems to rebuild lost information.

In some implementations, multiple IAS systems similar to IAS system 100 can connect via a network or bus extension, each allocating data blocks and parity blocks according to a distributed mapping function. By distributing I/O signals and parity calculations among multiple nodes, the RAIS architecture can reduce single-controller bottlenecks typically found in RAID. For example, a read request for a particular LBA can be served from whichever IAS system 100 physically stores that block, while parity updates can be processed in parallel by multiple servers.

In some implementations, the processing core(s) 108 can be configured to perform parity computations (e.g., generating partial parity blocks, updating existing parity blocks, recomputing missing parity, and/or any hardware-accelerated bitwise operations). That is, the processing core(s) 108 can accept signals representing old data blocks, new data blocks, and/or parity blocks to maintain fault tolerance in a RAIS configuration. For example, the processing core(s) 108 can combine new and old data blocks to derive partial parity, then merge partial parity with old parity to generate updated parity. Additionally, the processing core(s) 108 can offload computationally intensive bitwise tasks that would otherwise occupy CPU 104 resources. In some implementations, the processing core(s) 108 can interface and/or otherwise communicate with other components of the IAS system 100, for example, the processing core(s) 108 can interface with the CPU 104 by receiving parity commands, the processing core(s) 108 can interface with the local array of drives 122 and/or the memory 106 by reading or writing temporary computation buffers, and/or the processing core (s) 108 can interface with the communication channel 116 by transferring computed parity results.

In some implementations, the local array of drives 122 can be configured to store a plurality of data blocks (e.g., user data segments, parity blocks, metadata records, and/or any RAID-like structures). That is, the local array of drives 122 can receive read or write requests and/or data recovery requests from the I/O controller 110 and retain data blocks aligned to the mapping function stored in the local array of drives 122. For example, the local array of drives 122 can contain striped data blocks distributed across multiple physical disks for fault tolerance. Additionally, the local array of drives 122 can facilitate parallel I/O operations if multiple drives operate simultaneously. In some implementations, the local array of drives 122 can interface and/or otherwise communicate with other components of the IAS system 100, for example, the local array of drives 122 can interface with the I/O controller 110 by executing write commands, the local array of drives 122 can interface with the I/O controller 110 by handling read requests, and/or local array of drives 122 can interface with the CPU 104 by reporting drive status signals.

In some implementations, the processing core(s) 108 can be configured to perform signal-level processing (e.g., compression, decompression, data filtering, and/or any specialized transformations). That is, the processing core(s) 108 can offload algorithms from CPU 104, for example, refining data before it is written and/or after it is read. For example, the processing core(s) 108 can compress a data block to reduce space usage in the local array of drives 122. Additionally, the processing core(s) 108 can detect and correct certain low-level anomalies in the data stream. In some implementations, the processing core(s) 108 can interface and/or otherwise communicate with other components of the IAS system 100, for example, the processing core(s) 108 can interface with the local array of drives 122 by retrieving raw blocks, the processing core(s) 108 can interface with the CPU 104 by providing processed data, and/or the processing core(s) 108 can interface with the communication channel 116 by transmitting compression results.

In some implementations, the I/O controller 110 can be configured to dispatch read or write requests (e.g., queueing I/O operations, returning completion status, processing error signals, and/or any drive-level commands). That is, the I/O controller 110 can direct physical drive operations in the local array of drives 122 based on incoming control signals from CPU 104. For example, the I/O controller 110 can receive a command to write new data to a specific drive and forward the data payload to the designated address. Additionally, the I/O controller 110 can return interrupts and/or status updates indicating success or failure of an operation. In some implementations, the I/O controller 110 can interface and/or otherwise communicate with other components of the IAS system 100, for example, the I/O controller 110 can interface with the local array of drives 122 by sending block-level commands, the I/O controller 110 can interface with the CPU 104 by receiving write directives, and/or the I/O controller 110 can interface with the communication channel 116 by exchanging control and status signals.

In some implementations, the I/O controller 112 can be configured to manage external link signals (e.g., routing requests to a remote IAS system, handling inter-node messaging, controlling outbound data flows, and/or any remote access tasks). That is, the I/O controller 112 can direct communication signals for network or interconnect channels that are distinct from local storage operations. For example, the I/O controller 112 can transmit read requests to a remote IAS system across the communication channel 116 and receive returned data blocks for forwarding to the CPU 104. Additionally, the I/O controller 112 can coordinate handshake protocols to provide reliable data transfer in a distributed RAIS environment. In some implementations, the I/O controller 112 can interface and/or otherwise communicate with other components of IAS system 100, for example, the I/O controller 112 can interface with the CPU 104 by receiving command signals for remote reads, the I/O controller 112 can interface with the communication channel 116 by exchanging packets for external communication, and/or the I/O controller 112 can interface with the processing core(s) 108 by forwarding parity-related data.

In some implementations, the processing system 118A and/or other processing components (e.g., the CPU 104, the processing core(s) 108, and/or the processing system 118B) can be configured to execute parallel compute tasks (e.g., AI inference, cryptographic hashing, large-scale indexing, and/or any compute-intensive processes). That is, the processing system 118A can alleviate workload from CPU 104 by handling dedicated routines (e.g., that require high throughput). For example, the processing system 118A can scan multiple data blocks for pattern recognition before or after parity checks. Additionally, the processing system 118A can interface with DSP 114 if data requires additional signal-level transformations. In some implementations, the processing system 118A can interface and/or otherwise communicate with other components of the IAS system 100, for example, the processing system 118A can interface with the CPU 104 by receiving work assignments, the processing system 118A can interface with the local array of drives 122 by accessing data sets, and/or the processing system 118A can interface with the communication channel 116 by sending compute results.

In some implementations, the processing system 118B and/or other processing components (e.g., the CPU 104, the processing core(s) 108, and/or the processing system 118A) can be configured to perform data recovery operations in a RAIS environment. For example, the processing system 118B can identify a plurality of addresses for a plurality of lost data blocks mapped to the local array of drives 122 or to at least one remote array of drives on at least one remote IAS system, referencing an at least one mapping function stored in the local array of drives 122. The processing system 118B can generate read commands for the addresses, receive multiple read data blocks, and apply a plurality of operations to reconstruct the missing data blocks using corresponding parity blocks from the distributed parity mapping. Once reconstructed, the processing system 118B can remap the recovered data blocks to available storage locations in the local array of drives 122. In some implementations, the operations can be performed in accordance with the distributed data mapping of the data blocks and the distributed parity mapping of the parity blocks. Additionally, the processing system 118B can interface and/or otherwise communicate with other components of IAS system 100, for example, the processing system 118B can interface with the CPU 104 by issuing recovery trigger signals, the processing system 118B can interface with the local array of drives 122 by retrieving or updating mapping and parity data, and/or the processing system 118B can interface with the bus by transferring reconstructed data blocks.

In some implementations, when an IAS system 100 detects an uncorrectable block within its local array of drives 122, the processing system 118B and/or other processing components (e.g., the CPU 104, the processing core(s) 108, and/or the processing system 118A) can initiate a reconstruction process to recover the missing data using distributed parity mapping. That is, the IAS system 100 can first verify that the detected error is uncorrectable by checking error correction code (ECC) metadata stored alongside the data block. If the error exceeds the correction threshold, the processing system 118B can reference the distributed data mapping to determine which remote IAS systems store the corresponding parity blocks and/or surviving data blocks necessary for reconstruction. The IAS system 100 can then transmit a reconstruction request to the identified remote IAS systems, instructing them to retrieve the relevant parity and data blocks and return them for local processing. Once received, the IAS system 100 can execute an XOR operation using the retrieved blocks to reconstruct the lost data. In some implementations, the reconstructed data block can be remapped to a spare storage block within the local array of drives 122.

In some implementations, if the IAS system 100 detects that no spare storage blocks are available within its local array of drives 122, it can issue an additional request to the remote IAS systems to allocate a spare block for storing the reconstructed data. That is, the IAS system 100 can reference the distributed data mapping to identify remote IAS systems with available spare storage, then send a relocation request specifying the storage block address where the reconstructed data should be written. In response, the remote IAS system receiving the request can allocate a spare storage block, write the reconstructed data, and update its metadata to reflect the new location of the data block. Additionally, the processing system 118B of the initiating IAS system 100 can update the distributed data mapping and distributed parity mapping to reflect the reassignment of the recovered block. In some implementations, the RAIS system can periodically rebalance spare block allocations.

In some implementations, a bus (shown as the line connecting the components of computing system 102) can be configured to transport signals among system components (e.g., relaying command codes, moving data blocks, propagating interrupts, and/or any system-wide communication). That is, the bus can link the CPU 104, the processing core(s) 108, the I/O controllers 110 and 112, the DSP 114, and other systems for operation in the IAS system 100. For example, the bus can carry a write command from the CPU 104 to the I/O controller 110 and transfer completion status back to the CPU 104 upon success. Additionally, the bus can move partial parity data from the processing core(s) 108 to the local array of drives 122 for further processing.

In some implementations, any or all of the CPU 104, the processing system 118A, and/or the processing system 118B can be configured to process read operations for data blocks mapped to the local array of drives 122 or at least one remote array of drives (e.g., determining a physical address from a mapping function, issuing read commands locally or remotely, receiving the data blocks, and/or forwarding them to a requester). That is, the processing components can reference the distributed data mapping in the local array of drives 122 to identify whether a target data block resides in the local array of drives 122 or in a remote IAS system, then transmit the appropriate read signals. For example, if the block is mapped locally, the I/O controller 110 can perform a direct read operation; if the block is remote, the I/O controller 112 can forward a request to the remote IAS system. Additionally, the retrieved data blocks can be buffered in the local array of drives 122 and returned to a requesting application via the 116.

In some implementations, the processing core(s) 108 can be configured to apply compression techniques to data blocks before transmission across the communication channel 116 to a remote IAS system. That is, when a data block is read from storage and identified for transmission to a remote IAS, the processing core(s) 108 can execute a compression operation before passing the data block to the I/O controller 112. For example, the processing core(s) 108 can apply a lossless compression algorithm to reduce the size of the transmitted data while maintaining integrity. Additionally, the processing core(s) 108 can store metadata regarding the compression format in the memory 106 and/or the local array of drives 122, ensuring that the destination IAS can apply the corresponding decompression routine upon reception. In some implementations, the processing core(s) 108 can interface and/or otherwise communicate with other components of the IAS system 100, for example, the processing core(s) 108 can interface with the CPU 104 by receiving compression directives, the processing core(s) 108 can interface with the memory 106 by storing compression metadata, and/or the processing core(s) 108 can interface with the I/O controller 112 by passing compressed data blocks for network transmission.

In some implementations, the IAS system 100 can be configured to perform full IAS replacements when a hardware failure occurs in any of its components. That is, while failures can occur in the local array of drives 122, other components such as the CPU 104, memory 106, processing core(s) 108, and/or I/O controllers 110 and 112 can also fail, rendering the IAS system 100 inoperable. In such examples, the failed IAS system 100 can be replaced with a new IAS system, which must be reconstructed to mirror the data and operational state of the failed unit. The new IAS system can retrieve distributed configuration metadata from the local array of drives 122 and/or memory 106 or a remote IAS system and synchronize its storage block addresses, parity mappings, and/or logical-to-physical address translations with the other IAS systems in the RAIS environment. In some implementations, the CPU 104 and/or processing core(s) 108 of the new IAS system can interface with other IAS systems over the communication channel 116 to retrieve stored parity blocks and reconstruct lost data blocks. Additionally, the I/O controller 112 can initiate resynchronization of parity blocks across the RAIS environment to restore redundancy.

In some implementations, the I/O controller 112 can be configured to manage data transmissions across the communication channel 116 by handling compressed data blocks received from a remote IAS system. That is, when the I/O controller 112 detects incoming compressed data from a remote IAS, it can pass the data block to the processing core(s) 108 for decompression before forwarding it to storage. For example, upon receiving a compressed data block, the I/O controller 112 can reference memory 106 to determine the decompression parameters, then forward the data to the processing core(s) 108 for processing. Additionally, the I/O controller 112 can execute flow control operations to improve network traffic within the chassis-level switch, ensuring that compressed data packets are efficiently queued and transmitted. In some implementations, the I/O controller 112 can interface and/or otherwise communicate with other components of the IAS system 100, for example, the I/O controller 112 can interface with the CPU 104 by processing incoming network packets, the I/O controller 112 can interface with the communication channel 116 by routing compressed data, and/or the I/O controller 112 can interface with the local array of drives 122 by forwarding decompressed data for storage.

In some implementations, the communication channel 116 can be a chassis-integrated switch linking multiple IAS systems in a high-speed interconnect. That is, the network can function as an internal switching fabric embedded within the motherboard of the chassis. For example, each IAS system can be plugged into a dedicated slot within the chassis, directly interfacing with the communication channel 116 to transmit and receive data blocks with minimal latency.

Additionally, the communication channel 116 can employ a high-throughput protocol improved for low-overhead data exchanges between IAS systems, allowing compressed data to be transmitted with minimal buffering. In some implementations, the communication channel 116 can interface and/or otherwise communicate with other components of the IAS system 100, for example, the communication channel 116 can interface with the CPU 104 by facilitating inter-node message passing, the communication channel 116 can interface with the I/O controller 112 by transmitting read and write requests across the chassis, and/or the communication channel 116 can interface with the processing core(s) 108 by relaying compression and decompression metadata.

In some implementations, any or all the CPU 104, the processing system 118A, and/or the processing system 118B can be configured to write new data to a data block mapped to the local array of drives (e.g., reading an old data block, computing a partial parity block, writing the updated data block, and/or confirming operation status). That is, the processing components can apply the distributed parity mapping to combine old and new data, generating partial parity via the processing core(s) 108. For example, if the local array of drives 122 is overwritten, the CPU 104, the processing system 118A, and/or the processing system 118B can read the old data block from drives 122, XOR that block with new data, and instruct I/O controller 110 to write back the modified data block.

In some implementations, any or all the CPU 104, the processing system 118A, and/or the processing system 118B can be configured to write new data to a remote data block on at least one remote IAS system (e.g., transmitting the new data, receiving a partial parity block, computing final parity, and/or updating system redundancy). That is, the processing components can refer to the distributed data mapping and/or distributed parity mapping to identify the appropriate remote IAS system, then coordinate an updated parity operation. For example, the CPU 104, the processing system 118A, and/or the processing system 118B can transmit a write command via I/O controller 112 to send new data to the remote IAS system, retrieve a partial parity block from that remote system, and XOR it with an old parity block locally to generate a final parity. Additionally, the local array of drives 122 can be updated to reflect the new block location and parity status across the RAIS environment.

Generally, any or all the CPU 104, the processing core(s) 108, the processing system 118A, and/or the processing system 118B can be configured to execute and/or otherwise manage a RAIS driver (IASD) that facilitates low-level control over distributed data storage, parity computation, and/or system redundancy operations within a RAIS configuration. The RAIS driver (IASD) can interface with the operating system and storage hardware to translate high-level file system operations into precise storage block commands. That is, the IASD can be used to compute logical-to-physical address translations, coordinate data striping across IAS systems, synchronize distributed parity updates, and/or maintain metadata structures that define relationships between data blocks and parity blocks across the RAIS system. For example, when a read or write request is issued, the IASD can determine the target logical block address (LBA), resolve its corresponding storage block address (SBA) using a mapping function (e.g., Equation 1), and identify the responsible IAS system via an IAS ID computation (e.g., Equation 3a or Equation 3b). Additionally, for write operations, the IASD can identify the parity block associated with a given data block (e.g., Equation 4) and execute XOR operations to update parity accordingly. In some implementations, the IASD can manage command queues that prioritize read, write, and/or recovery tasks based on system conditions. That is, the IASD can be executed to coordinate parity recalculations in parallel across different IAS nodes. For example, when writing new data to an IAS system, the IASD can be used to first retrieve the original data block and associated parity block, compute the partial parity update via an XOR operation, and finalize parity synchronization by distributing the updated parity to the designated IAS system.

In some implementations, the processing core(s) 108 can execute a RAIS driver (IASD) to facilitate low-level execution of read, write, and recovery operations across the IAS system 100. The IASD can issue direct instructions to the I/O controller 110 and I/O controller 112 to facilitate storage operations while handling processing tasks such as compression, encryption, XOR-based parity calculations, and data reconstruction. That is, the processing core(s) 108 can execute the IASD to manage command sequencing, facilitating processing stages before being written to the local array of drives 122 or transmitted to a remote IAS system. For example, when executing a write operation, the processing core(s) 108 can process an IASD instruction sequence that first applies compression, encrypt the data, compute the parity block using XOR operations, and/or issue a write command to the I/O controller 110 for local storage and/or to the I/O controller 112 for remote transmission. Additionally, the IASD can reference distributed parity mapping data to determine the placement of the parity block across multiple IAS systems.

In some implementations, the processing core(s) 108 can execute the IASD to facilitate read operations by managing sequential retrieval, decryption, and/or decompression tasks while interfacing with the I/O controllers. That is, the processing core(s) 108 can issue a read command via the IASD to the I/O controller 110 for local storage access and/or to the I/O controller 112 if the requested data block is stored in a remote IAS system. Upon retrieving the data block, the IASD can execute processing operations in a pipelined architecture, decrypting and decompressing the data before forwarding it to the requesting system component. For example, when retrieving an encrypted and compressed block from a remote IAS system, the processing core(s) 108 can execute an IASD instruction sequence that retrieves the block via the I/O controller 112 and applies decryption and decompression before making the data available for further processing. Additionally, the IASD can track pending read requests and manage execution order to maintain consistency in data processing pipelines.

In some implementations, the processing core(s) 108 can execute the IASD to manage distributed parity operations, including parity updates and data reconstruction. That is, when a data block is modified, the IASD can direct the processing core(s) 108 to retrieve the original data block and corresponding parity block, compute a partial parity update using XOR operations, and/or issue a write command to update the parity block in the appropriate IAS system. For example, the IASD can execute an instruction sequence where the processing core(s) 108 first retrieves the old parity block, XORs it with the new data block, and then issues a storage command via the I/O controllers to write the updated parity block. Additionally, if an IAS system detects an uncorrectable error, the IASD can execute a recovery sequence where the processing core(s) 108 retrieves surviving data and parity blocks from distributed IAS nodes, performs XOR operations to reconstruct the missing block, and/or remaps the reconstructed data to an available storage location.

In some implementations, a first IAS (e.g., IAS system 100) can include a local array of drives (e.g., the local array of drives 122) configured to store parity data and configuration data. That parity data can include data indicating how parity blocks are calculated, distributed, and/or updated across the IAS systems. The configuration data can system parameters, logical-to-physical mappings, and/or define how IAS system interfaces with other IAS systems. The first IAS can include at least one storage device (e.g., local array of drives 122) configured to store a plurality of data blocks and a plurality of parity blocks. Additionally, the first IAS can include at least one processing system (e.g., CPU 104, processing systems 118A and 118B, processing core(s) 108) configured to perform a plurality of parity operations based on the parity data and perform a plurality of redundant array of independent servers (RAIS) operations based on the configuration data. The parity operations can be computations to generate, update, and/or utilize parity blocks for error correction and data recovery (e.g., XOR-based parity calculations, distributed parity updates across multiple IAS systems, parity-based fault detection, and/or parallel execution of parity reconstruction processes). Additionally, each IAS system can independently determine which parity blocks correspond to which data blocks using the parity data. The RAIS operations can be distributed storage and redundancy management tasks across multiple IAS systems. RAIS operations (e.g., instead of replicating entire files like in RAID-based servers) work at the block level, striping and recovering data dynamically. In some implementations, the configuration data can be independently maintained by the IAS systems in its own configuration data (e.g., how an IAS system interfaces with other IAS systems, including which data blocks are stored locally vs. remotely, which IAS system is responsible for a given parity block, and/or how LBAs are mapped across storage devices). Additionally, the first IAS system can include at least one network interface (e.g., I/O controller 112 and/or communication channel 116) can be configured to transmit and receive a plurality of data blocks to and from at least one second IAS (e.g., another IAS system 100).

In some implementations, the plurality of RAIS operations can include at least storing the plurality of data blocks in the at least one storage device and striping (e.g., distributing data blocks across multiple IAS systems) a portion of the plurality of data blocks across the at least one second IAS. In some implementations, the plurality of RAIS operations can include at least performing data recovery based on reconstructing at least one missing data block using the plurality of parity blocks and executing distributed parity computations in parallel with the at least one second IAS. That is, each IAS system can perform operation in parity calculations (e.g., if one IAS system fails, the system can reconstruct lost data from distributed parity blocks without relying on a single point of failure). In some implementations, the plurality of parity includes at least determining the plurality of parity blocks for a portion of the plurality of data blocks striped across the at least one second IAS. That is, the first IAS can determine where parity blocks should be placed and computed.

In some implementations, the configuration data (e.g., used to determine data block placement, striping, and failover management) can include a plurality of instructions for mapping at least one logical block address (LBA) to at least one location in the at least one storage device or the second IAS. In some implementations, the parity data (e.g., used to execute distributed XOR operations, validate redundancy, and/or reconstruct missing data) can include a plurality of data structures including a plurality of parity block locations, a plurality of redundancy levels, a plurality of error correction parameters, and/or a plurality of instructions for reconstructing at least one missing data block using distributed parity computations across the first IAS and the second IAS. In some implementations, the first IAS can be one of a plurality of IASs of a first data group of a plurality of data groups of a RAIS.

In some implementations, the IAS system 100 can include multiple processing units interconnected through a high-speed bus fabric to facilitate efficient data exchange across components. The processing core(s) 108 can operate in conjunction with cache memory and interconnect controllers to execute computational tasks. The memory 106 and non-volatile memory 120 store operational data and/or executable instructions necessary for coordinating storage and processing operations. The I/O controllers 110 and 112 can manage data transfer between the local array of drives 122 and remote IAS systems. A cache-coherent architecture can be implemented to maintain consistency across distributed storage nodes, enabling parallelized execution of tasks.

In some implementations, the IAS system 100 can include dedicated interfaces for communication and data movement, supporting both internal and external data pathways. The processing core(s) 108 can perform various logical and arithmetic operations, including those related to parity computation, redundancy management, and/or fault detection. The IAS system 100 can be structured to improve workload distribution across multiple processing elements while maintaining low-latency access to storage. Power regulation components, including clock management circuits and voltage controllers, can be implemented to maintain stable performance under varying workloads. Debugging and diagnostic interfaces can be integrated for monitoring system health and performing real-time system adjustments as needed.

The RAIS environment and/or IAS system 100 can include at least some of the components, features, and functionality of the distributed storage and computing systems described herein with respect to FIG. 1. By way of example and not limitation, an IAS system can be embodied as a data center node, a high-performance computing (HPC) server, a cloud storage appliance, a network-attached storage (NAS) system, a storage area network (SAN) controller, an enterprise storage solution, a database server, a parallel computing node, a fault-tolerant computing system, a machine learning inference node, a content delivery network (CDN) cache server, a scientific computing cluster node, an edge computing gateway, a virtualization host, a distributed ledger storage node, an archival storage system, an industrial automation controller, a telecommunications storage hub, and/or any combination of these systems.

The IAS system 100 can include at least some of the components, features, and functionality of the example computing device(s) described herein with respect to FIG. 1. By way of example and not limitation, an IAS system can be embodied as an artificial intelligence (AI) driven RAIS (Redundant Array of Independent Servers) storage controller, an AI-accelerated distributed storage node, an AI-based fault tolerance and redundancy management system, an AI-integrated data recovery engine, an AI-enhanced distributed parity computation unit, an AI-powered storage virtualization controller, an AI-driven multi-node storage processor, an AI-assisted RAID alternative architecture, a neural network-enhanced storage optimization unit, a federated learning-based storage node, an AI-enabled multi-tier storage management system, a machine learning-driven data replication controller, and/or an AI-powered dynamic storage allocation engine. Additionally, the IAS system 100 can be implemented as an AI-optimized distributed storage cluster, an AI-driven self-healing storage node, an AI-supported parallel data processing unit, a deep learning-enhanced storage redundancy engine, or any combination of these delineated AI-integrated RAIS processing devices, and/or any other suitable AI-enhanced system.

In some implementations, the IAS system 100 can be configured to perform checksum verification to maintain data integrity and improve storage operations. The processing core(s) 108 can execute checksum algorithms (e.g., CRC, Fletcher, Adler-32, SHA-based hashing) to verify data integrity during read, write, and/or reconstruction processes. That is, when data is stored in the local array of drives 122 and/or transmitted across the communication channel 116 to a remote IAS system, the processing core(s) 108 can compute a checksum and associate it with the corresponding data block. Upon retrieval, the processing core(s) 108 can recalculate the checksum and compare it with the stored value to detect corruption, transmission errors, and/or unintended modifications.

In some implementations, the IAS system 100 can execute AI workloads by providing distributed storage and processing support. The local array of drives 122 can store data blocks used for AI model execution, including training datasets, model parameters, and/or inference results. The processing core(s) 108 can execute AI-related computations, such as matrix operations and tensor transformations, while the CPU 104 can facilitate data access and task distribution. That is, the IAS system 100 can facilitate AI model execution by handling concurrent read and write operations across multiple IAS nodes, reducing data retrieval latency.

Figure 2:
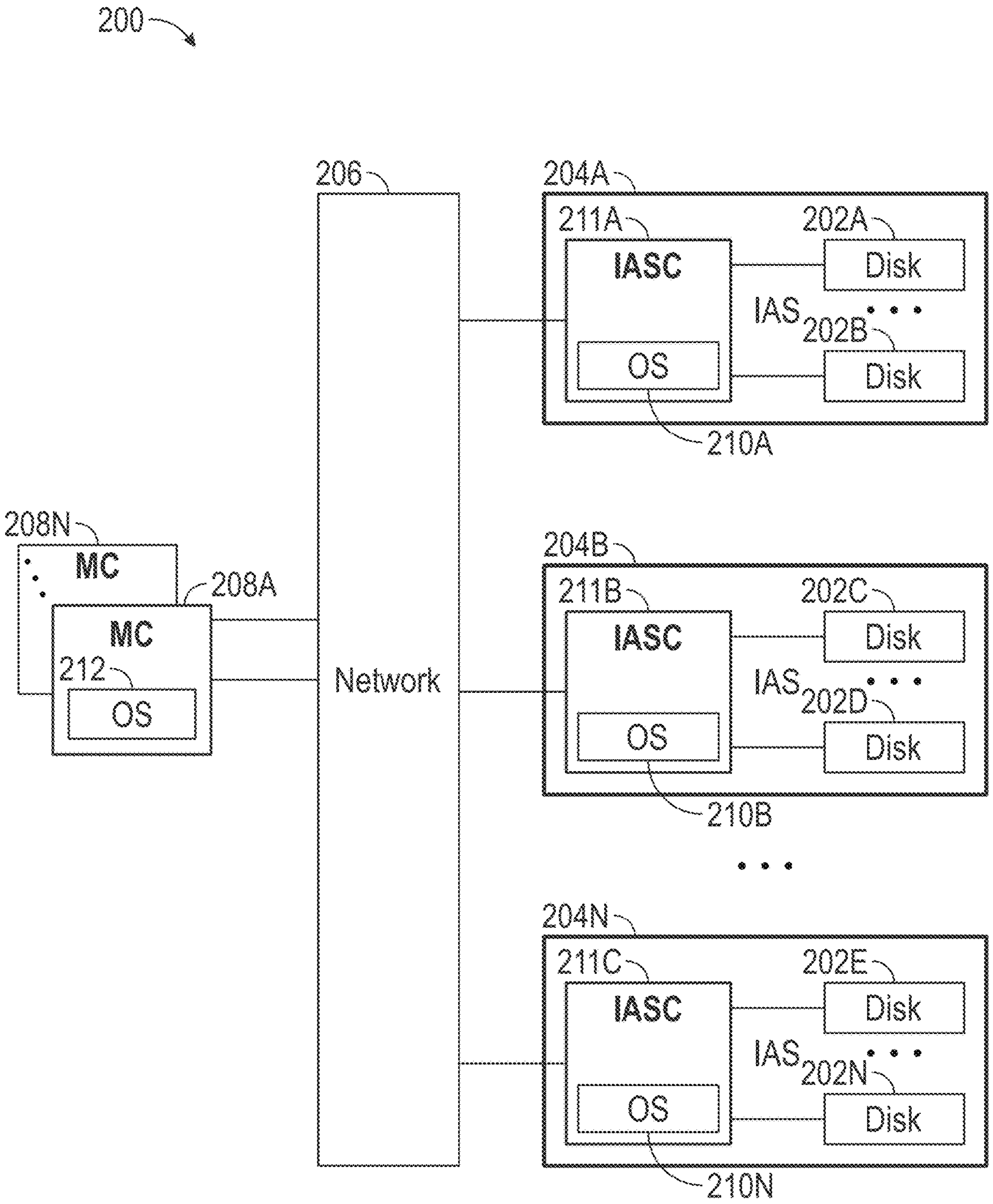
FIG. 2 is a block diagram illustrating an example RAIS environment including IAS systems, according to some implementations.

Referring now to FIG. 2, a block diagram illustrating an example RAIS environment including IAS systems, according to some implementations. In some implementations, FIG. 2 illustrates a RAIS system including a plurality of integrated atomic server (IAS) systems (e.g., 204A, 204B, 204N) interconnected through a network 206 (e.g., wired, wireless). The IAS systems can be configured to perform distributed storage, redundancy management, and/or fault tolerance in parallel by executing tasks that are traditionally managed by a centralized controller (e.g., in a RAID system). Each IAS system can function as an independent storage node while participating in distributed data and parity mapping across multiple systems. Management controllers (MCs) (e.g., 208A, 208N) can oversee system-wide operations, including configuration management, data recovery, and device discovery. That is, the MCs 208A-208N can be configured to manage system-wide metadata, store master configuration files, initiate device discovery at power-up, monitor the utilization of each IAS system, and/or coordinate data recovery operations by issuing read and write commands to reconstruct lost data blocks based on distributed parity mappings. For example, an MC 208A can maintain a master configuration file that stores information regarding RAIS sets, including stripe counts, RAIS set identifiers, and IAS membership. When a failure occurs, the MC 208A can retrieve this data and dispatch reconstruction tasks to the relevant IAS systems.

For example, each IAS system (e.g., 204A, 204B, 204N) can operate as a field-replaceable unit (FRU). That is, if an internal component (e.g., a drive 202A, 202B) encounters an unrecoverable error, the IAS system can automatically remap lost data to another local reserved drive instead of requiring direct physical replacement. That is, re-mapping can occur by identifying the logical block addresses (LBAs) associated with the lost data, determining alternative storage locations based on available storage block addresses (SBAs), and/or updating the distributed mapping function to point to the new locations. For example, if a drive 202A in IAS system 204A fails, the processing circuitry of 204A can scan available reserved blocks, select a replacement location in another drive 202B, and/or update the distributed mapping table accordingly. The MC 208A can log this modification and replicate the update across the system to maintain consistency.

In some implementations, each IAS system 204A, 204B, 204N can include an IAS compute (IASC) system (e.g., 211A, 211B, 211C) configured to manage local storage (e.g., drives 202A, 202B, 202C, 202D, 202E) and interface with remote IAS systems over network 206. The IASC can execute an operating system (OS) 210A, 210B, 210N and implement RAIS operations such as data striping, distributed parity calculations, and recovery mechanisms. The IASC system can include similar features and functionality as computing system 102 of FIG. 1. For example, the IASC system 211A can receive a read request from an application, determine whether the requested data is stored locally or on another IAS system, and/or issue a remote read command if necessary. Additionally, the IASC system 211B can write new data by first retrieving an old data block, computing a partial parity block, and/or updating the corresponding parity block using the distributed parity mapping. In some implementations, each IASC system can manage private and shared storage and/or memory regions. The private region can store local configuration information (e.g., system settings, security keys, and firmware updates) and the shared region can allocate block addresses for a RAIS set.

In some implementations, one or more Management Controllers (MCs) 208A, 208N can be assigned to oversee the RAIS system. The MCs can store a master configuration file containing metadata such as RAIS set sizes, stripe counts, and redundancy levels. For example, the MC 208A can perform device discovery during system startup, identifying all connected IAS systems and reporting system-wide capacity, utilization, and/or available storage to an administrator interface via a distributed RAIS management application (DRMA). Additionally, if an IAS system requires replacement, the MC 208N can issue a RAIS rebuild command, which prompts the remaining IAS systems to reconstruct lost data using distributed parity and redundancy mappings. Each MC 208A, 208N can store a mirrored copy of the master configuration file. Updates to system settings or RAIS configurations can be automatically synchronized across all MCs.

In some implementations, the IAS systems 204A, 204B, 204N can communicate over a network 206 using a RAIS messaging protocol. Data striping can be performed across multiple IAS systems by dynamically allocating logical block addresses (LBAs) and parity blocks to optimize storage efficiency and fault tolerance. For example, if an IAS system 204B receives a write request, it can determine the corresponding RAIS set ID, assign a stripe ID, and distribute the data across multiple IAS storage nodes. Additionally, if an IAS system fails, the network 206 can facilitate a data reconstruction operation, where surviving IAS systems execute distributed parity computations to restore lost blocks.

In some implementations, when an IAS system 204 detects an uncorrectable block within its local array of drives, it can initiate a reconstruction process by transmitting requests to relevant remote IAS systems 204A, 204B, 204N over the network 206. The initiating IAS system can first verify that the block is uncorrectable by referencing its stored error correction metadata. If the detected error cannot be resolved locally, the IAS system can identify the required parity and data blocks stored across the RAIS set using the distributed data mapping. The IAS system can then issue reconstruction requests to the remote IAS systems storing the corresponding parity blocks and surviving data blocks. The remote IAS systems, upon receiving the request, can retrieve the specified blocks from their local storage and transmit them back to the requesting IAS system 204. Upon receiving the necessary blocks, the initiating IAS system can execute an XOR operation to reconstruct the lost data block. The reconstructed data block can then be remapped to a spare storage block within the local IAS system to maintain redundancy and fault tolerance.

In some implementations, if the initiating IAS system 204 determines that no spare storage blocks are available in its local storage, it can send an additional request to the remote IAS systems 204A, 204B, 204N to allocate a spare storage block within their local storage. That is, the initiating IAS system can reference the distributed data mapping to identify a remote IAS system with available spare storage and transmit a relocation request specifying the target storage block address. Upon receiving the request, the remote IAS system can allocate a spare storage block, store the reconstructed data, and update its metadata to reflect the reassignment. Additionally, the initiating IAS system 204 can update the distributed data mapping and parity mapping to reflect the new location of the recovered block. In some implementations, the RAIS system can periodically rebalance spare block allocations to ensure that redundancy levels remain consistent across all IAS systems, preventing storage imbalances that could lead to system-wide inefficiencies.

In some implementations, each RAIS set can be defined by a RAIS configuration file, which specifies parameters such as stripe count, logical block mappings, and redundancy levels. This configuration file can be maintained in the local array of drives and/or other storage component of each IAS system and mirrored across all MCs. For example, when creating a new RAIS drive, an administrator can use DRMA to specify storage parameters. The IAS system 204A, 204B, 204N can verify available resources (e.g., the number of IAS systems, remaining storage capacity) before finalizing the configuration. Once the configuration is applied, the IAS systems 204A, 204B, 204N can perform automatic parity distribution (e.g., data and parity blocks are stored across separate systems).

In some implementations, the IAS systems 204A, 204B, 204N can perform distributed data recovery using the mapping function to reconstruct lost data. For example, if an IAS system 204N fails, the remaining IAS systems can retrieve parity blocks stored on other IAS nodes, compute missing data using XOR operations and/or other operations, and redistribute reconstructed blocks across available storage. Additionally, IAS 204A can remap data to reserved storage blocks in response to detecting a drive failure. In some implementations, the RAIS system can support hot-pluggable IAS units, meaning that a failed IAS system can be replaced without requiring a full system shutdown. Once a new IAS system is inserted, it can retrieve its configuration file from the MC 208A and synchronize stored data.

In some implementations, each IAS system 204A, 204B, 204N can maintain a RAIS configuration data structure, which can include parameters defining the organization of data and parity blocks across multiple IAS systems. The RAIS configuration data structure can contain, but is not limited to, the following fields stripe count, stripe ID, RAIS set ID, RAIS start address, RAIS end address, and/or RAIS size. That is, the stripe count can indicate the total number of stripes in the RAIS set, where each stripe corresponds to a distinct IAS system within the distributed storage group. The stripe ID can serve as a unique identifier for each stripe, allowing the IAS system 204A, 204B, 204N to compute the logical block address mapping. For example, an IAS system 204A can reference the stripe ID to determine the correct physical storage location for a data block across the RAIS array. Additionally, the RAIS set ID can uniquely identify a RAIS set such that associated stripes can share a common identifier. The RAIS start address and RAIS end address can define the range of physical addresses assigned to logical block addresses within the RAIS system. The RAIS size can specify the total storage capacity allocated to the RAIS set.

In some implementations, each IAS system 204A, 204B, 204N can store its RAIS configuration file in the local array of drives (e.g., inside the disks 202A, 202B, . . . 202N and/or inside the IASC system 211A, 211B, 211C). That is, during system power-up, each IAS system 204A, 204B, 204N can read its configuration file to determine whether it functions as a MC or a standard IAS node. For example, a MC 208A can reference the master configuration file containing metadata about all RAIS sets in the system, including their size, redundancy settings, and connected IAS nodes. Additionally, each IAS system can maintain a backup copy of its configuration file in an SSD 202A, 202B. When an IAS system joins the network, it can retrieve its RAIS configuration file to establish its role in distributed data management. If an IAS system 204A, 204B, 204N fails and is replaced, the MC can distribute the most recent configuration settings to the new unit.

In some implementations, each IAS system 204 can be configured to execute inter-node watchdog monitoring to ensure continuous operation of all IAS systems within the RAIS system. That is, each IAS system 204A, 204B, 204N can maintain a watchdog timer that periodically pings all and/or some other IAS systems over the network 206 to verify system health, independent of active data transfers. Each IAS system 204 can maintain a record of recent heartbeat responses and use a timeout threshold to determine whether a remote IAS system is unresponsive. If an IAS system 204 fails to respond within the threshold period, the detecting IAS system can mark it as offline and initiate fault tolerance protocols. In some implementations, the detecting IAS system can broadcast a status update to all other IAS systems 204A, 204B, 204N to confirm the failure and adjust data mappings accordingly. The RAIS system can then update the distributed data mapping to reroute data access operations and, if necessary, reconstruct any lost data blocks from distributed parity blocks stored across other IAS systems. Additionally, the watchdog monitoring mechanism can prevent reliance on failed nodes by dynamically reassigning storage responsibilities within the RAIS environment.

In some implementations, the IAS systems 204A, 204B, 204N within the RAIS system can collectively reconstruct a replaced IAS system when any or some of its internal components fail. That is, failures are not limited to the storage devices (e.g., drives 202A, 202B) but can include processing units, communication interfaces, and memory subsystems. When an IAS system 204 is deemed inoperable, it can be removed and replaced with a new IAS system that lacks prior storage state information. The new IAS system can be reconstructed using distributed recovery processes to restore the exact data and parity block structure of the failed unit. The remaining IAS systems 204A, 204B, 204N can reference the distributed data mapping and distributed parity mapping stored in memory and transmit the data blocks and parity blocks over the network 206 to repopulate the storage of the new IAS system. In some implementations, the management controllers (MCs) 208A, 208N can coordinate the reconstruction by issuing system-wide synchronization commands. Once reconstruction is complete, the RAIS system can resume normal operation without data loss or redundancy degradation.

Generally, referring to the IAS systems 204, 204B, 204N, collectively referred to as IAS system(s) 204. The IAS system 204 can include a local array of drives and/or storage device storing at least one configuration data structure (e.g., defining how data blocks, parity blocks, and logical block addresses are allocated across IAS systems) including at least one mapping function for at least one logical block address. That mapping function can be a function used to translate logical block addresses (LBAs) to physical storage locations in the local or remote IAS system 204 Additionally, the IAS system 204 can include a local array of drives configured to store a plurality of data blocks. In some implementations, the IAS system 204 can include processing circuitry configured to perform a plurality of first operations to maintain distributed redundancy across a plurality of the IAS systems and perform a plurality of second operations on the plurality of data blocks mapped to the local array of drives or a plurality of remote data blocks on at least one remote array of drives of at least one remote IAS system 204

For example, the first operations can be distributed redundancy functions (e.g., managing and painting fault tolerance, parity computations, and data recovery in a decentralized manner). In another example, the second operations can be a direct data storage, retrieval, and/or update operations across local and remote drives (e.g., data block reads, data block writes, LBA mapping, parallel execution of read/write operations). Additionally, the IAS system 204 and the remote IAS system 204 share a distributed data mapping of the plurality of data blocks and the plurality of remote data blocks. In some implementations, the IAS system 204 and the remote IAS system 204 share a distributed parity mapping of a plurality of parity blocks and a plurality of remote parity blocks. That is, the distributed data mapping can be a system-wide mapping structure that determines where data blocks are stored across multiple IAS systems. This can prevent a single point of failure by allowing each IAS system 204 to resolve the location of data independently. The parity block mapping can be a parity block allocation scheme that assigns parity storage locations dynamically across IAS systems. This can ensure that no single IAS system 204 is responsible for all parity calculations, increasing fault tolerance and balancing computation.

In some implementations, the processing circuitry of the IAS system 204 can be configured to read at least one data block of the plurality of data blocks mapped to the local array of drives based on the at least one mapping function to determine a physical address and retrieve the at least one data block. In some implementations, the read is at least one of the plurality of second operations. That is, the IAS system 204 can translate the requested LBA into a physical address within the local storage of the IAS system. In some implementations, the processing circuitry of the IAS system 204 can be configured to read at least one remote data block of the plurality of remote data blocks on the at least one remote array of drives of the remote IAS system 204 by transmitting a read command to the at least one remote IAS system, receiving the at least one remote data block in response, and forwarding the at least one remote data block to a requesting application.

In some implementations, when the processing circuitry of the IAS system 204 retrieves at least one remote data block from the at least one remote array of drives of the remote IAS system 204, the remote IAS system 204 can apply a compression operation to reduce the size of the transmitted data block before sending it over the communication channel. That is, the remote IAS system 204 can execute a lossless compression algorithm and/or any other compression function (e.g., Huffman coding, Lempel-Ziv-Welch (LZW), run-length encoding (RLE)) to improve network bandwidth and reduce transmission overhead while maintaining data integrity. For example, the processing circuitry of the remote IAS system 204 can reference metadata in the local configuration data structure to determine the applicable compression format, apply the corresponding compression routine, and transmit the compressed data block to the requesting IAS system 204. Additionally, the processing circuitry of the IAS system 204 can identify the compressed data format upon reception and apply a corresponding decompression algorithm before forwarding the data block to memory or storage. In some implementations, compression metadata can be stored in memory of the remote IAS system 204 to track the applied transformation.

In some implementations, the communication channel between the IAS system 204 and the remote IAS system 204 can be an internal switching fabric embedded within the chassis, allowing low-latency data transmission across IAS systems installed within adjacent slots. That is, the network interconnect operates as a high-throughput, motherboard-level switch, reducing contention and enabling direct, high-speed data exchanges between IAS systems without the need for an external networking infrastructure. For example, when the IAS system 204 requests a remote data block, the remote IAS system 204 can transmit the compressed data block through the internal switch, which routes the transmission directly to the destination IAS system 204 without additional processing delays. Additionally, the internal switching fabric can dynamically manage data transfer priorities, ensuring that remote read operations are executed with minimal impact on concurrent storage operations within the RAIS system. In some implementations, the processing circuitry of the IAS system 204 can monitor network utilization statistics and optimize transmission parameters based on observed traffic patterns, further improving data retrieval efficiency.

In some implementations, the processing circuitry of the IAS system 204 can be configured to write new data to at least one of the plurality of data blocks mapped to the local array of drives by reading an old data block (e.g., to compute the parity) of the plurality of data blocks mapped to the local array of drives, performing an operation (e.g., XOR operation) on the old data block with the new data to determine a partial parity block, and writing the new data to the local array of drives. In some implementations, the writing is at least one of the plurality of second operations and is based on the distributed parity mapping of the plurality of parity blocks.

In some implementations, the processing circuitry of the IAS system 204 can be configured to write new data to at least one of the plurality of remote data blocks on the at least one remote array of drives of the at least one remote IAS system 204 by transmitting the new data to the at least one remote IAS system, receiving a partial parity block determined by the at least one remote IAS system, and performing an operation with an old parity block of the plurality of parity blocks to generate a new parity block. In some implementations, the operation is at least one of the plurality of first operations and is performed based on the distributed data mapping of the plurality of data blocks and the plurality of remote data blocks and the distributed parity mapping of the plurality of parity blocks and the plurality of remote parity blocks.

In some implementations, the processing circuitry of the IAS system 204 can be configured to perform data recovery by identifying a plurality of addresses for a plurality of lost data blocks of the plurality of data blocks mapped to the local array of drives or the plurality of remote data blocks on the at least one remote array of drives of the at least one remote IAS system 204 and corresponding plurality of parity blocks of the plurality of parity blocks and the plurality of remote parity blocks using the at least one mapping function, generating a plurality of read commands for the plurality of addresses, receiving a plurality of read data blocks, performing a plurality of operations to reconstruct the plurality of lost data blocks using the plurality of parity blocks and the plurality of read data blocks, and remapping the reconstructed plurality of lost data blocks to a plurality of blocks in the local array of drives. That is, the reconstruction operations can include performing distributed XOR operations, using the retrieved parity blocks and surviving data to reconstruct missing blocks. In some implementations, the plurality of operations are performed based on the distributed data mapping of the plurality of data blocks and the plurality of remote data blocks and the distributed parity mapping of the plurality of parity blocks and the plurality of remote parity blocks.

In some implementations, the processing circuitry of the IAS system 204 can be configured to maintain at least one command queue including a plurality of priority levels (e.g., for read and/or write operations), and to perform a plurality of commands in parallel when writing or reading one of the plurality of data blocks mapped to the local array of drives or one of the plurality of remote data blocks on the at least one remote array of drives of the at least one remote IAS system 204

In some implementations, the processing circuitry of the IAS system 204 can be configured to determine or update at least one distributed parity block of the plurality of parity blocks and the plurality of remote parity blocks corresponding with one of the plurality of data blocks mapped to the local array of drives or one of the plurality of remote data blocks on the at least one remote array of drives of the at least one remote IAS system 204 In some implementations, the determination or update is at least one of the plurality of first operations. In some implementations, the at least one distributed parity block is stored in one of the plurality of the IAS systems based on the distributed parity mapping of the plurality of parity blocks and the plurality of remote parity blocks. In some implementations, the IAS system 204 can be one of a plurality of the IAS systems of a first data group (e.g., RAIS sets) of a plurality of data groups of a redundant array of independent servers (RAIS).

For example, the IASC 211A (e.g., functioning both as a host and a controller within a RAIS system) can store a plurality of data blocks and a plurality of parity blocks across a plurality of storage block addresses (SBAs) in a local storage (e.g., disk 202A and/or disk 202B) and in at least one remote storage (e.g., disk 202C, disk 202D, disk 202E, and/or disk 202N) of at least one remote IAS system 204 based on a mapping function (e.g., determines stripe placement, parity distribution, and logical-to-physical block assignment). In some implementations, each RAIS set of a plurality of RAIS sets (e.g., logical grouping of stripes managed by the distributed IAS system) can include a plurality of stripes. Each stripe of the plurality of stripes includes a portion of the plurality of data blocks and at least one of the plurality of parity blocks. In some implementations, storing can be performed based on a distributed data mapping (e.g., blocks can be spread across IAS systems 204) of the plurality of data blocks and a distributed parity mapping of the plurality of parity blocks. Additionally, in this example IASC 211A can perform a plurality of operations (i) to maintain distributed redundancy on the stored plurality of data blocks and the stored plurality of parity blocks to maintain distributed redundancy across a plurality of the IAS systems, or (ii) on (e.g., reading, writing, and/or updating data stored within a local IAS system or remote IAS system) the stored plurality of data blocks mapped to the at least one local storage or on the stored plurality of remote data blocks on the at least one remote storage of the at least one remote IAS system 204. That is, the failure of any IAS system does not result in data loss (e.g., achieved through distributed storage and parity calculations).

In some implementations, the IASC 211A (e.g., processing circuits) can be configured to allocate a plurality of spare storage block addresses within the local storage and the remote storage, and to remap at least one of the plurality of data blocks to a spare storage block address responsive to detecting a failure in an original storage block address. That is, the remapping can be performed based on the distributed data mapping of the plurality of data blocks. In some implementations, the IASC 211A (e.g., processing circuits) can be configured to maintain at least one distributed metadata structure including a plurality of entries identifying a relationship between the plurality of data blocks, the plurality of parity blocks, and a plurality of corresponding SBAs in the local storage and the remote storage. In some implementations, at least one of the plurality of operations performed by the one or more processing circuits includes updating the at least one distributed metadata structure based on at least one update in the stored plurality of data blocks. In some implementations, the IASC 211A (e.g., processing circuits) can be configured to perform at least one recovery operation by retrieving a plurality of surviving data blocks and at least one parity block from the local storage or the remote storage, performing an operation between the plurality of surviving data blocks and the at least one parity block to reconstruct at least one missing data block, and writing the reconstructed at least one missing data block to an SBA determined based on the distributed data mapping of the plurality of data blocks.

Figure 3:
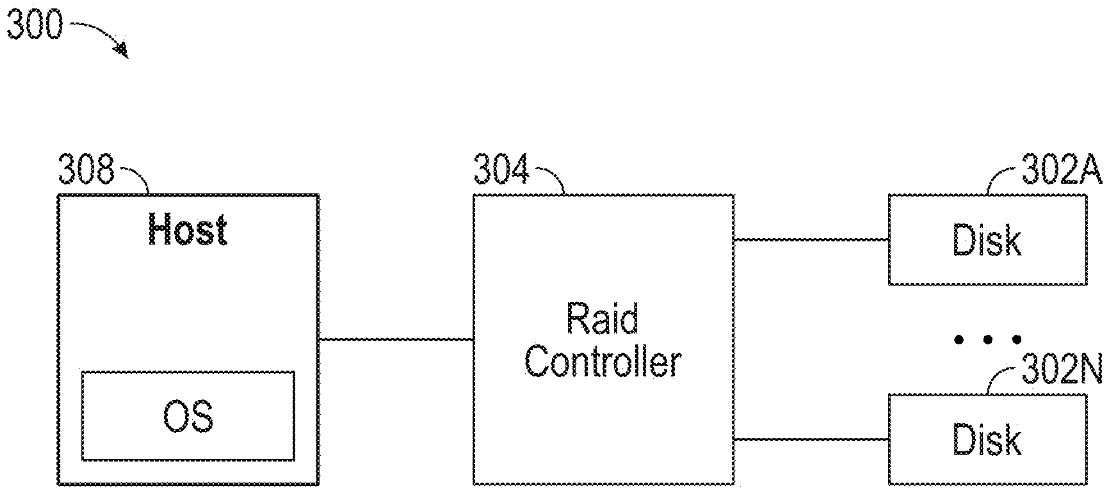
FIG. 3 is a block diagram illustrating a traditional RAID environment, according to some implementations.

Referring now to FIG. 3, a block diagram illustrating a traditional RAID environment, according to some implementations. The RAID system 300 can include a host 308, a RAID controller 304, and a plurality of disks 302A-302N. The host 308 can execute an operating system (OS) that manages file system operations and transmits I/O requests to the RAID controller 304. The RAID controller 304 manages data redundancy by distributing data and parity blocks across the disks 302A-302N using RAID configurations (e.g., RAID 0, RAID 1, RAID 5, RAID 6). That is, the RAID controller 304 determines parity placement, issues read and write operations, and reconstructs lost data upon disk failure. For example, in a RAID 5 configuration, the RAID controller 304 performs XOR operations across data blocks to generate parity, which is stored across disks 302A-302N to facilitate single-drive failure recovery.

As described herein, the RAID system 300 has technical limitations compared to RAIS-based architectures. The RAID controller 304 acts as a centralized control unit, introducing a single point of failure that can disrupt access to disks 302A-302N if the controller malfunctions. Additionally, the RAID system 300 lacks distributed parity mapping, meaning all parity computations occur within the RAID controller 304, leading to processing bottlenecks under high-load conditions. In contrast, a RAIS-based system distributes data and parity blocks across multiple IAS systems, each performing independent RAIS operations to eliminate reliance on a central controller.

Furthermore, while RAID system 300 can support hot-pluggable scalability at the individual disk level, allowing disks 302A-302N to be replaced without disrupting overall system operation, RAIS systems can manage scalability at a different level. In a RAIS system, individual disks within an IAS unit may not be directly hot-pluggable in the same manner, as the IASC and the disks are enclosed within an integrated system. Instead, the entire IAS system can operate as a replaceable component within a larger infrastructure, where it can be inserted or removed as a single entity. This design supports modular system management, allowing for the replacement or expansion of storage capacity without requiring direct access to individual disks.

The RAID controller 304 also manages parity updates synchronously, increasing write latency, whereas RAIS allows parallelized parity updates across multiple IAS systems, reducing computational overhead and improving fault tolerance. Thus, RAIS architectures provide greater redundancy, distributed computational efficiency, and improved scalability over traditional RAID system 300.

Figure 4:
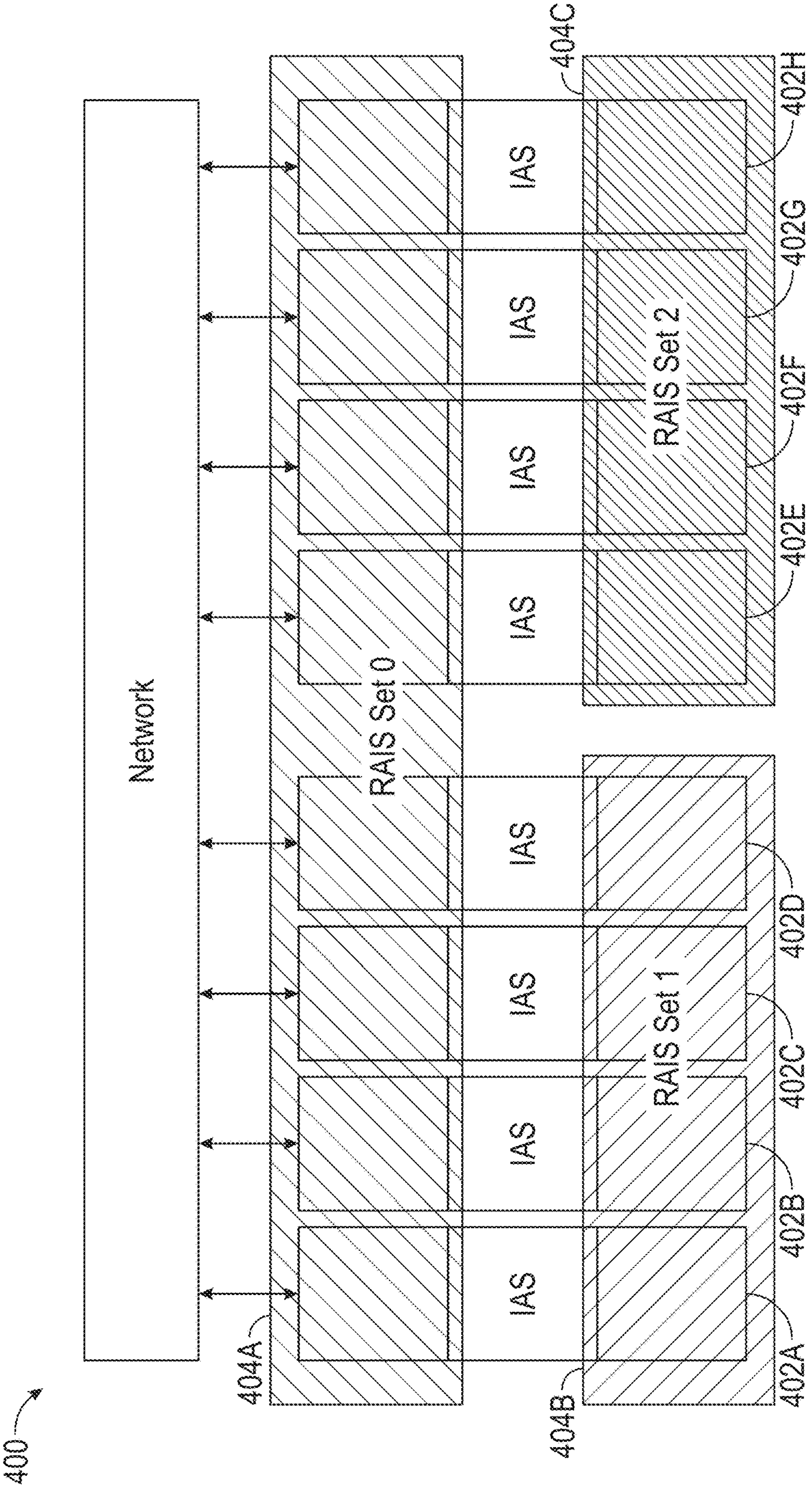
FIG. 4 is a block diagram illustrating an example RAIS system including multiple IAS systems that are connected via a network, according to some implementations.

Referring now to FIG. 4, a block diagram illustrating an example RAIS system 400 including multiple IAS systems 402A-402H that are connected via a network, according to some implementations. In some implementations, the IAS systems 402A-402H can be assigned to multiple RAIS sets 404A-404C, each managing distributed storage and parity operations. That is, each RAIS set 404A-404C implements a distributed storage architecture where logical block addresses are mapped to physical storage across multiple IAS systems. For example, in RAIS Set 0 (404A), data is allocated across all eight IAS systems 402A-402H using a distributed mapping function. Additionally, RAIS Set 1 (404B) and RAIS Set 2 (404C) each manage separate storage allocations across subsets of IAS systems, with RAIS Set 1 (404B) operating across IAS systems 402A-402D and RAIS Set 2 (404C) operating across IAS systems 402E-402H.

In some implementations, each RAIS set 404A-404C can store logical block address mappings in a distributed configuration across IAS systems 402A-402H. That is, each IAS system can store segments of multiple RAIS sets while maintaining separate allocation tables for each. For example, RAIS Set 0 (404A) can allocate a first subset of logical block addresses across all IAS systems 402A-402H, while RAIS Set 1 (404B) maps another subset across IAS systems 402A-402D. Additionally, each RAIS set can execute read and write operations independently, with each IAS system processing requests in parallel. In some implementations, data striping parameters, such as stripe width and parity block distribution, are determined based on the RAIS configuration file, which can be synchronized across all IAS systems.

In some implementations, the RAIS system 400 can execute parity-based redundancy operations across distributed storage locations. That is, each RAIS set 404A-404C can compute parity for stored data and distribute it across multiple IAS systems based on the distributed parity mapping. For example, if an IAS system 402C fails, RAIS Set 1 (404B) can retrieve parity data from IAS systems 402A, 402B, and 402D and reconstruct lost data using XOR-based computations. Additionally, each IAS system can execute parity updates independently, with read-modify-write sequences being handled locally or in coordination with remote IAS systems via the network. In some implementations, read and write operations can be executed based on stored parity metadata, which determines which IAS systems store parity data for a given set of blocks.

In some implementations, the RAIS system 400 can execute data management and allocation functions across multiple IAS systems. That is, each RAIS set 404A-404C can store data redundancy parameters, block allocation metadata, and parity mappings within its assigned IAS systems. For example, RAIS Set 0 (404A) can allocate logical block addresses across all eight IAS systems 402A-402H, while RAIS Set 1 (404B) maintains a separate allocation structure for IAS systems 402A-402D. Additionally, each IAS system can process block remapping operations independently, where failed storage locations are reallocated within the same RAIS set. In some implementations, block address remapping occurs dynamically in response to storage failures, with updates being propagated across the network to maintain consistency across all IAS systems.

In some implementations, the RAIS system 400 can support system expansion by integrating additional IAS systems into existing RAIS sets or creating new RAIS sets. That is, newly added IAS systems can be assigned logical block addresses and parity mappings based on available storage capacity and configuration parameters. For example, if additional storage resources are required, a new IAS system can be added to RAIS Set 0 (404A), expanding the number of available storage locations. Additionally, newly added IAS systems can receive a copy of the RAIS configuration file, allowing them to synchronize storage mappings and participate in distributed storage operations. In some implementations, system expansion occurs without requiring service interruptions, with storage reallocation being performed as background processes executed by each IAS system.

Figure 5:
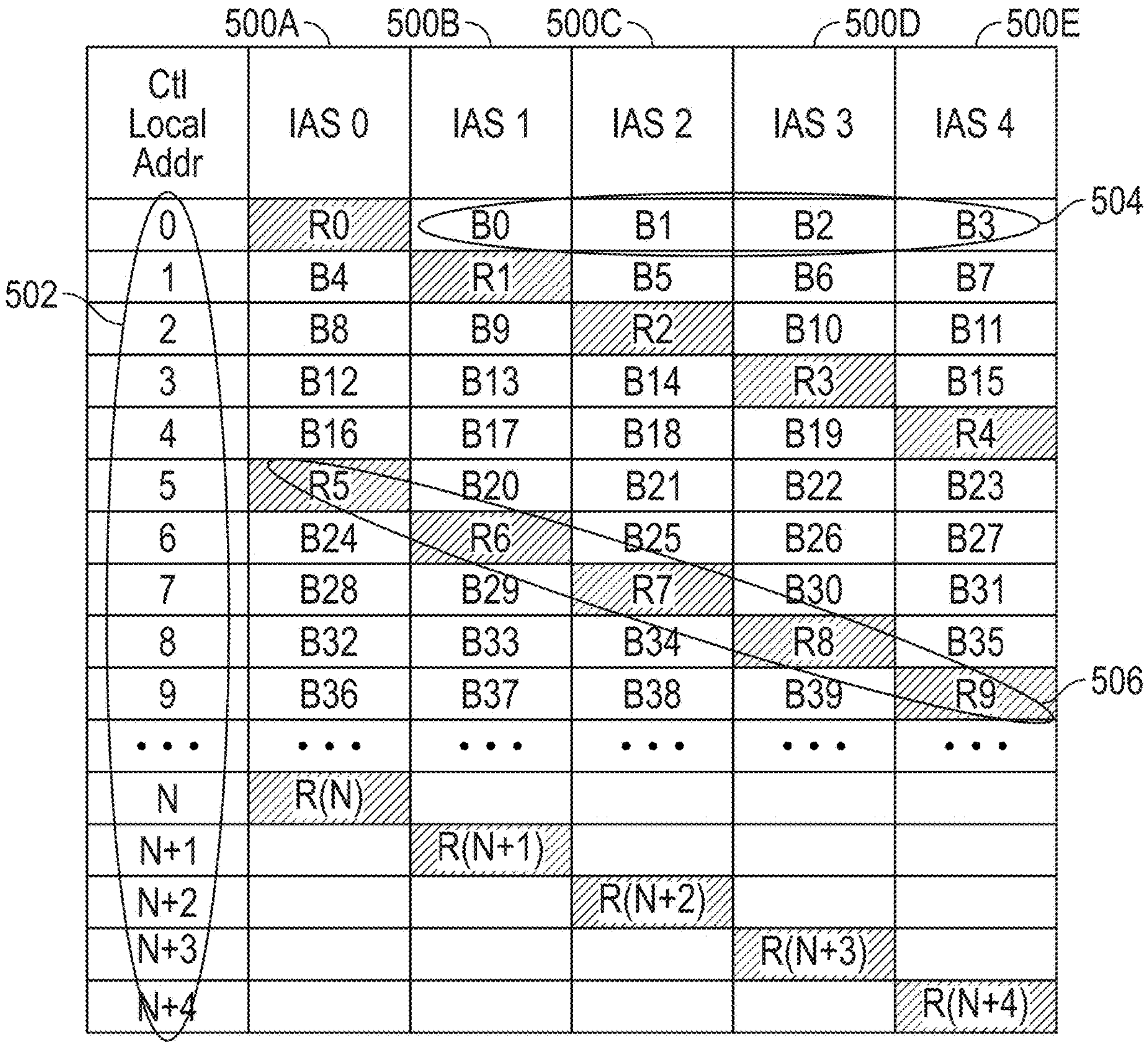
FIG. 5 is a block diagram illustrating an example RAIS logical-to-physical block mapping, according to some implementations.

Referring now to FIG. 5, a block diagram illustrating an example RAIS logical-to-physical block mapping 500, according to some implementations. FIG. 5 illustrates how logical block addresses (LBAs) can be distributed across multiple IAS systems 500A-500E. In some implementations, each IAS system can manage a portion of the logical drive, mapping LBAs to its local storage block addresses. That is, the first column 502 represents the control local address, where each row corresponds to a block address. For example, LBA 0 maps to B0 in IAS 1 (500B), LBA 1 maps to B1 in IAS 2 (500C), and so forth. The logical data blocks labeled B0, B1, B2, B3, etc. (504) represent actual data blocks, while parity blocks labeled R0, R1, R2, etc. (506) are distributed across multiple IAS systems for redundancy.

In some implementations, data striping can occur across multiple IAS systems 500A-500E, distributing storage and redundancy operations. That is, each IAS system stores a portion of the data blocks in a RAIS set, reducing contention during storage operations. For example, LBA 0 for B0 resides in IAS 1 (500B), LBA 1 for B1 resides in IAS 2 (500C), and LBA 2 for B2 resides in IAS 3 (500D). Additionally, parity blocks labeled R0, R1, R2, etc. (506) store the XOR result of the corresponding data blocks in each row. For example, R5 holds the XOR result of B20, B21, B22, and B23, while R6 holds the XOR result of B24, B25, B26, and B27.

In some implementations, the parity blocks of a RAIS set can not be stored in a single IAS system but can be distributed to avoid bottlenecks. That is, if all parity blocks were stored in a single IAS system, all other IAS systems would need to communicate with it for read, write, and/or recovery operations, increasing latency. For example, in FIG. 5, the parity blocks R0 through R4 are distributed across IAS 0 (500A), IAS 1 (500B), IAS 2 (500C), IAS 3 (500D), and IAS 4 (500E). This distribution ensures that no single IAS system becomes a bottleneck during storage or recovery operations.

In some implementations, writing new data can include recomputing the associated parity block. That is, a partial parity value can be first computed using the XOR difference between the old data and new data, and then the old parity block is updated accordingly. For example, if B22 is updated with B22new, the previous data B22old can be first read. A partial parity can be computed as B22new⊕B22old, and the old parity R5old is read from R5. The updated parity is then computed as R5new=R5old⊕(B22new⊕B22old), and the new data and updated parity can be written to storage.

In some implementations, each IAS system functions as both an initiator (host) and a RAIS controller, eliminating the need for a centralized RAID controller. That is, each IAS system can execute an operating system (OS) and a storage driver that manages block mappings and parity computations. For example, when an application accesses a file system, the IAS system where it runs acts as an initiator for the request, issuing low-level storage commands to store or retrieve data. Additionally, a RAIS driver (IASD) operates as an interface between the operating system and storage hardware. That is, the IASD driver can be implemented on the computing system 102 (e.g., processor core(s) 108) of FIG. 1 as a software-based driver that translates logical storage requests from the operating system into low-level commands executed by the IAS system hardware, including the CPU 104, the processing core(s) 108, and/or processing systems 118A and 118B. For example, when an application issues a read or write request, the IASD driver can compute the corresponding storage block addresses, determine the associated parity blocks, and generate the necessary commands to execute the requested operation using the distributed data and parity mappings.

In some implementations, the IASD can be used to compute storage block addresses for logical data and parity blocks, allowing each IAS system to independently execute storage tasks. That is, given an LBA (B), storage block address $SBA_{data}$ can be determined using (Equation 1):

$$SBA_{data} = (B+1) + \left(\frac{B}{\text{stripe}_{count}}\right)$$

where B is the logical block address and the stripe count determines the number of IAS systems in a stripe.

Given a storage block address (SBA), the stripe ID can be determined as (Equation 2):

$$\text{stripe}_{ID} = SBA \ \% \ \text{stripe}_{count}$$

where % can be the modulus operator and SBA can be the physical storage block address within an IAS (e.g., an address assigned within a shared storage pool of the IAS system).

The corresponding IAS ID for a given storage block address can be determined as $$IAS_{ID} = \left((SBA \ \% \ \text{stripe}_{count}) + \text{start}_{IAS_{ID}}\right)\% \ IAS_{count} \qquad \text{(Equation 3a)}$$

where $\text{start}_{IAS_{ID}}$ can be an index value representing the first IAS system in a given RAIS set, and $IAS_{count}$ can be the total number of IAS systems participating in the distributed storage configuration, and/or or alternatively (Equation 3b):

$$IAS_{ID} = \left(\text{stripe}_{ID} + \text{start}_{IAS_{ID}}\right)\% \ IAS_{count}$$

In some implementations, the IAS system(s) can dynamically determine the locations of data and parity blocks to execute read, write, and/or recovery operations in parallel. That is, given a parity block storage address ($SBA_{parity}$), the corresponding data blocks can be retrieved using $$SBA_{parity} = (SBA_{data} - (SBA_{data} \ \% \ \text{stripe}_{count})) + \text{stripe}_{ID} \qquad \text{(Equation 4)}$$

Additionally, a storage block address of a parity block across multiple IAS systems can be determined using (Equation 5):

$$SBA_{parity}[N] = (\text{stripe}_{ID} * \text{stripe}_{count} + \text{stripe}_{ID}) + (\text{stripe}_{count} * \text{stripe}_{count} * N)$$
$$\text{where } N = 0 \text{ to } \left(IAS_{parity_{cnt}} - 1\right)$$

where N represents the parity block index, and $IAS_{parity_{cnt}}$ can be the total number of IAS systems designed to store parity blocks within a RAIS set, and mapping all the party blocks in the RAIS can also be performed using (Equation 6):

$$SBA_{parity}[N] = (N * \text{stripe}_{count}) + (N \ \% \ \text{stripe}_{count})$$
$$\text{where } N = 0 \text{ to } \left(RAIS_{parity_{cnt}} - 1\right)$$

where $RAIS_{parity_{cnt}}$ can be the total number of parity blocks distributed across the RAIS sets.

Using these computations, an IAS system can determine whether a given storage block contains a parity block using (Equation 7):

$$\left|(SBA \ \% \ \text{stripe}^2_{count}) - (\text{stripe}_{ID} * \text{stripe}_{count} + \text{stripe}_{1D})\right| == 0$$

If the result is TRUE, the storage block contains a parity block. Additionally, the location of the data blocks associated with a particular parity block can be determined using the storage block of the parity block (Equation 8):

$$\text{if}\begin{pmatrix} N < (SBA_{parity} \ \% \ \text{stripe}_{count}); \\ SBA_{data}[N] = (SBA_{parity} - (SBA_{parity} \ \% \ \text{stripe}_{count})) \end{pmatrix} + N$$
$$\text{else } (SBA_{data}[N] = (SBA_{parity} - (SBA_{parity} \ \% \ \text{stripe}_{count})) + N;$$
$$\text{where } N = 0 \text{ to } (\text{stripe}_{count} - 2)$$

In some implementations, read and write commands are managed via command queues. That is, storage requests can prioritized based on access latency and data dependencies, allowing high-priority tasks to execute before lower-priority requests. For example, write operations requiring parity updates can be prioritized, while background data recovery tasks can be scheduled based on system load. Additionally, multiple IAS systems can execute commands in parallel, reducing latency and improving overall performance.

In some implementations, the IAS system(s) can dynamically remap logical block addresses to physical storage blocks across IAS systems to handle failures without downtime. It should be understood that when referring to IAS system(s) it can encompass one or more IAS systems operating independently, in coordination with other IAS systems, and/or as part of a distributed RAIS configuration that maintains redundancy, load balancing, and/or data integrity across multiple storage nodes. That is, when a storage block fails, its data and parity are reconstructed using distributed parity computations and reassigned to available storage locations. For example, if a failure occurs in IAS 2 (500C), the data blocks stored in IAS 2 can be reconstructed using parity blocks from IAS 0 (500A), IAS 1 (500B), IAS 3 (500D), and IAS 4 (500E) and reassigned to a new storage block.

In some implementations, the IAS system(s) can support dynamic scalability, allowing IAS systems to be added and/or removed without disrupting active storage operations. That is, when a new IAS system is added, it receives an updated RAIS configuration file, synchronizing its storage mapping with the existing IAS systems. For example, new logical block addresses can be redistributed across available IAS systems. Additionally, parity blocks can be reassigned dynamically to maintain redundancy across all connected systems.

In some implementations, the IAS system(s) improve parity block placement based on system load and access frequency, balancing storage workloads across multiple IAS systems. That is, high-traffic data blocks can be stored in IAS systems with lower utilization, while frequently accessed parity blocks can be stored redundantly to minimize access latency. For example, if an IAS system experiences higher read traffic, the system can redistribute parity blocks to avoid bottlenecks. In some implementations, each IAS system can independently manage its storage resources. That is, storage policies determine how data is allocated, replicated, and/or retrieved to minimize and/or reduce contention between IAS systems. For example, data replication policies can prioritize high-availability storage. Additionally, storage redundancy can be maintained dynamically, with each IAS system monitoring its storage health and redistributing data.

In some implementations, the IAS system(s) can dynamically manage logical-to-physical address mappings to facilitate efficient read, write, and/or recovery operations across multiple IAS systems. That is, each IAS system can maintain a mapping table that associates logical block addresses (LBAs) with corresponding storage block addresses (SBAs). For example, given an LBA, an IAS system can compute its SBA using Equation 1, determine its stripe ID using Equation 2, and identify the corresponding IAS system using Equation 3a or Equation 3b. This allows IAS systems to locate data blocks and parity blocks dynamically.

In some implementations, the IAS system(s) can minimize and/or reduce reconfiguration overhead when modifying storage allocations. That is, when an IAS system is added or removed, the system can update its RAIS configuration data structure without affecting existing mappings. For example, Equations 4, 5, and 6 can be used to compute updated $SBA_{parity}$ locations without requiring full system reorganization. Additionally, Equations 7 and 8 facilitate determination of parity and data block relationships, allowing selective updates rather than full storage remapping.

In some implementations, parity block updates in the IAS system(s) can be performed incrementally to reduce computational overhead. That is, rather than recalculating parity for an entire stripe, the IAS system can compute a partial parity update using the modified data. For example, when updating B22 in IAS 3 (500D), the system first retrieves B22old and computes $partial_{parity}$=B22new⊕B22old. The IAS system can then retrieve R5old and updates it using R5new=R5old⊕$partial_{parity}$.

In some implementations, the IAS system(s) can distribute read and write operations across multiple IAS systems to improve performance. That is, instead of processing requests sequentially, the system executes multiple I/O operations in parallel. For example, a read request for B1, B1, B2, and B3 can be processed simultaneously by IAS 1 (500B), IAS 2 (500C), IAS 3 (500D), and IAS 4 (500E). Similarly, when writing new data, each IAS system can compute its parity block independently. In some implementations, the IAS Driver (IASD) can manage RAIS operations at the storage block level (e.g., providing consistency between logical block addresses (LBAs) and storage block addresses (SBAs)). That is, the IASD can translate high-level file system requests into low-level storage commands, computing block locations and distributing I/O operations accordingly. For example, when a write operation modifies a data block, the IASD can identify the affected SBA, updates the corresponding parity block using Equation 4, and synchronizes changes across the distributed system.

In some implementations, the IAS system(s) can use distributed processing to accelerate data recovery operations. That is, when an IAS system detects a failed storage block, it can reconstruct the missing data using distributed parity computations. For example, if IAS 2 (500C) experiences a failure, the system retrieves the associated parity blocks from IAS 0 (500A), IAS 1 (500B), IAS 3 (500D), and IAS 4 (500E), performing XOR operations to reconstruct the missing data and writing it to an available storage block. In some implementations, the IAS system(s) can dynamically balances I/O traffic across IAS systems to optimize performance. That is, the IAS system(s) can monitor access patterns and redistributes data blocks to avoid contention. For example, if IAS 1 (500B) experiences high read latency due to frequent access to B0, B4, B8, etc., the IAS system(s) can migrate a portion of the data to IAS 3 (500D) or IAS 4 (500E).

In some implementations, the IAS system(s) can support fault-tolerant storage reallocation to handle drive failures without data loss. That is, when an IAS system detects an unrecoverable storage error, it remaps the affected blocks to an available storage location. For example, if B22 in IAS 3 (500D) becomes unreadable, the IAS system can reconstruct B22 using parity block R5 and reassigns it to a new storage block in IAS 4 (500E). In some implementations, the IAS system(s) can maintain command queues for prioritizing storage operations. That is, high-priority commands (e.g., data recovery, parity updates) can be processed before lower-priority background tasks. For example, if a read request for B0 and a parity update for R5 arrive simultaneously, the IAS system can prioritize the read request to ensure low-latency data access while deferring the parity update to a background process.

In some implementations, the IAS system(s) can support hot-swappable IAS units, allowing storage components to be added or removed without disrupting operations. That is, when a new IAS system is inserted, it automatically synchronizes with the existing RAIS configuration, receiving updated mapping and parity data. For example, if a new IAS 5 is added to an existing RAIS set, the system distributes a portion of the data and parity blocks to the new unit, optimizing storage utilization. In some implementations, the IAS system(s) dynamically adjusts parity distribution based on storage utilization and access frequency. That is, if a specific IAS system experiences higher read traffic, the IAS system(s) can redistribute parity blocks to balance workload distribution. For example, if IAS 2 (500C) consistently handles frequent read requests, the IAS system(s) can shift some parity blocks to IAS 0 (500A) or IAS 4 (500E).

In some implementations, the IAS system(s) can dynamically allocate spare storage block addresses to handle failures without manual intervention. That is, when an IAS system detects a failing storage block, it can automatically reassign the affected data to a pre-allocated spare block. For example, if B36 in IAS 0 (500A) is marked as unreliable, the IAS system writes a reconstructed version of B36 to a spare block in IAS 1 (500B). In some implementations, the IAS system(s) can support multi-tiered storage management. That is, frequently accessed data blocks can be assigned to IAS systems with higher performance, while lower-priority data is stored in less utilized storage. For example, encryption keys and artificial intelligence (AI) models can be stored in IAS 0 (500A) and IAS 1 (500B), while log files and scratch data are stored in IAS 3 (500D) and IAS 4 (500E).

In some implementations, the IAS system(s) can automatically update metadata structures to reflect changes in storage configuration. That is, when a RAIS set is expanded or reconfigured, the IAS system(s) can synchronize updated mappings across all IAS systems. For example, if a new parity scheme is introduced, the IAS system(s) propagate changes to each IAS system. In some implementations, the IAS system(s) can ensure data integrity through real-time parity validation and/or error detection mechanisms. That is, periodic background processes can verify stored data against parity blocks, identifying and correcting inconsistencies. For example, if a background process detects a mismatch between B22, B23, B24, and parity block R5, the IAS system(s) can recalculate the expected parity and repairs the data block if discrepancies are found. In some implementations, the IAS system(s) can utilize redundant parity schemes.

Figure 6:
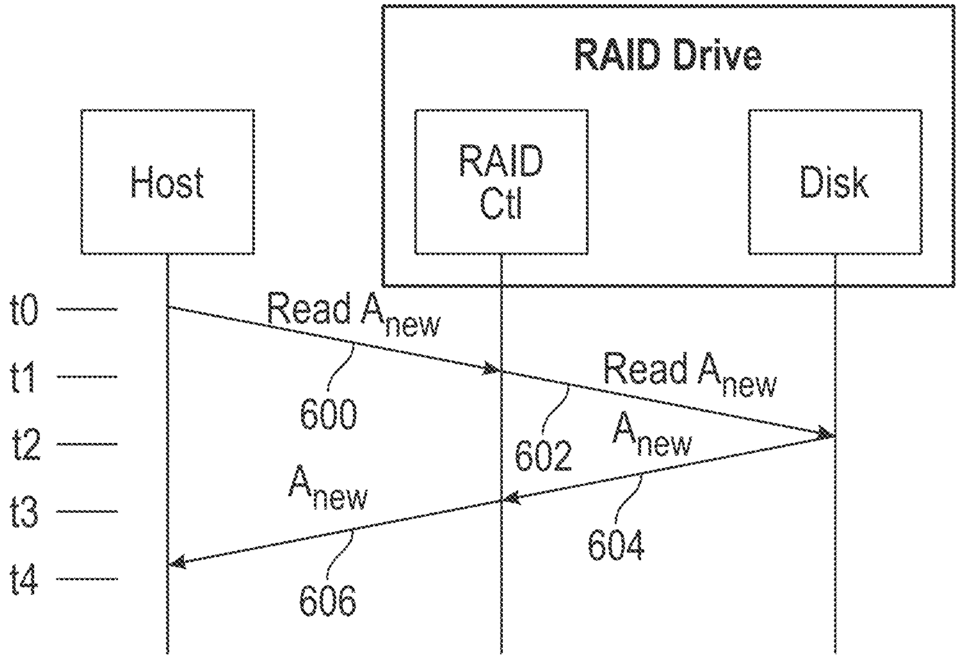
FIG. 6 is an example illustration of a process and interactions between components of a centralized RAID system when reading a data block from a RAID drive, according to some implementations.

Referring now to FIG. 6, an example illustration of a process and interactions between components of a centralized RAID system when reading a data block from a RAID drive, according to some implementations. At time t0, a read request for address $A_{new}$ is transmitted from the host to the RAID controller (600). At time t1, the RAID controller forwards the read request to the disk storing $A_{new}$ (602). At time t2, the disk retrieves $A_{new}$ and sends it back to the RAID controller (604). At time t3, the RAID controller transmits $A_{new}$ back to the host (606), completing the read operation. This sequence highlights the reliance on the RAID controller to mediate read operations, potentially creating bottlenecks as all requests are funneled through the central controller.

Figure 7:
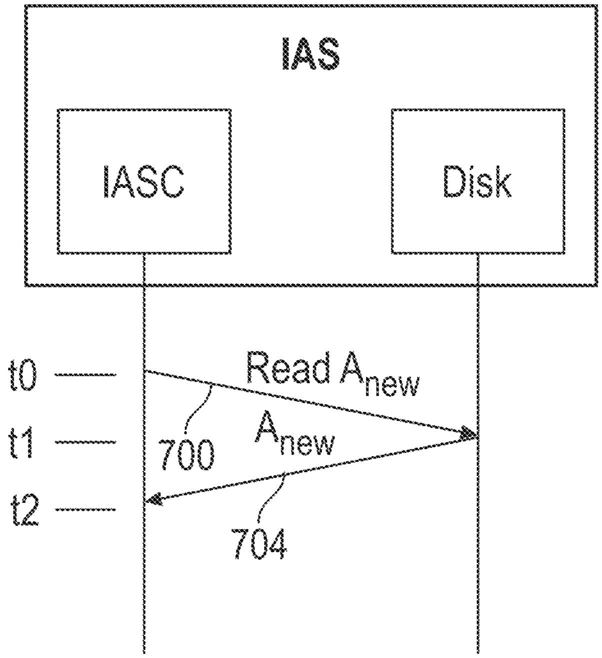
FIG. 7 is an example illustration of a process and interactions within a RAIS system when reading a data block stored in the same IAS system, according to some implementations.

Referring now to FIG. 7, an example illustration of a process and interactions within a RAIS system (e.g., IAS system 100 of FIG. 1) when reading a data block stored in the same IAS system, according to some implementations. At time t0, a read request for address $A_{new}$ is issued by an IAS controller (IASC) (700). At time t1, the request is directly processed within the same IAS, with the disk retrieving $A_{new}$. At time t2, the disk sends $A_{new}$ back to the IASC (704), completing the operation. By eliminating the need for an external RAID controller, this configuration reduces communication latency and improves system efficiency.

Figure 8:
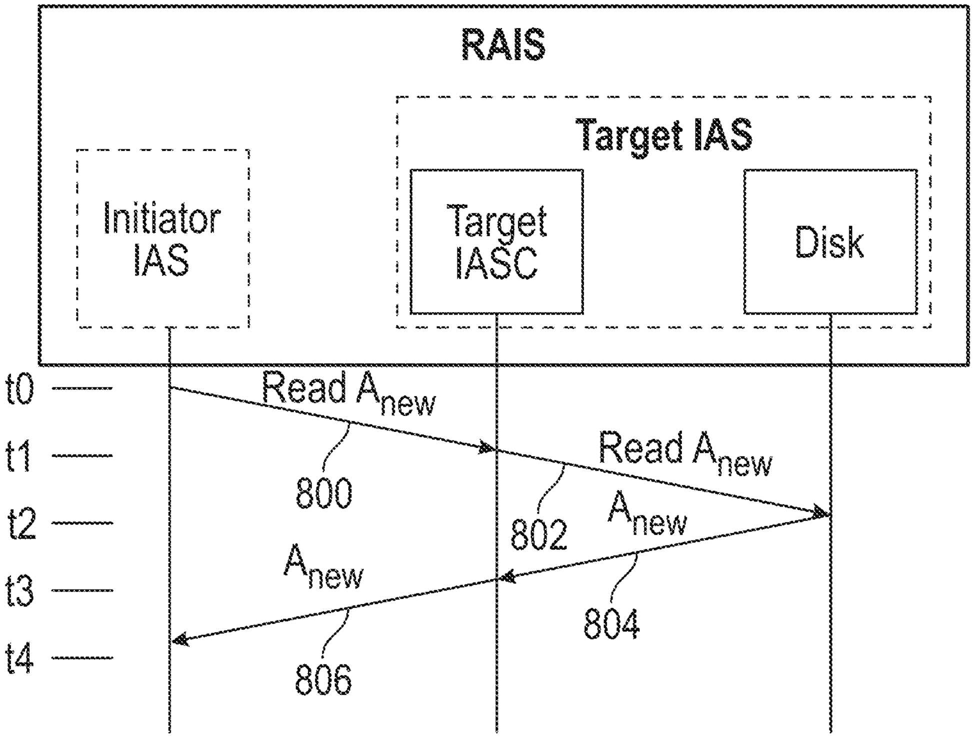
FIG. 8 is an example illustration of a process and interactions within a RAIS system when reading a data block from a different IAS system, according to some implementations.

Referring now to FIG. 8, an example illustration of a process and interactions within a RAIS system (e.g., IAS system 100 of FIG. 1) when reading a data block from a different IAS system, according to some implementations. At time t0, the initiator IAS transmits a read request for address $A_{new}$ to the target IAS (800). At time t1, the target IASC processes the request and sends a read request to the disk storing $A_{new}$ (802). At time t2, the disk retrieves $A_{new}$ and transmits it back to the target IASC (804). At time t3, the target IAS transmits $A_{new}$ back to the initiator IAS (806), completing the read operation. FIG. 8 illustrates the distributed architecture of RAIS, where any IAS system can act as an initiator, reducing the reliance on a single controller and improving parallelism in data retrieval.

Figure 9:
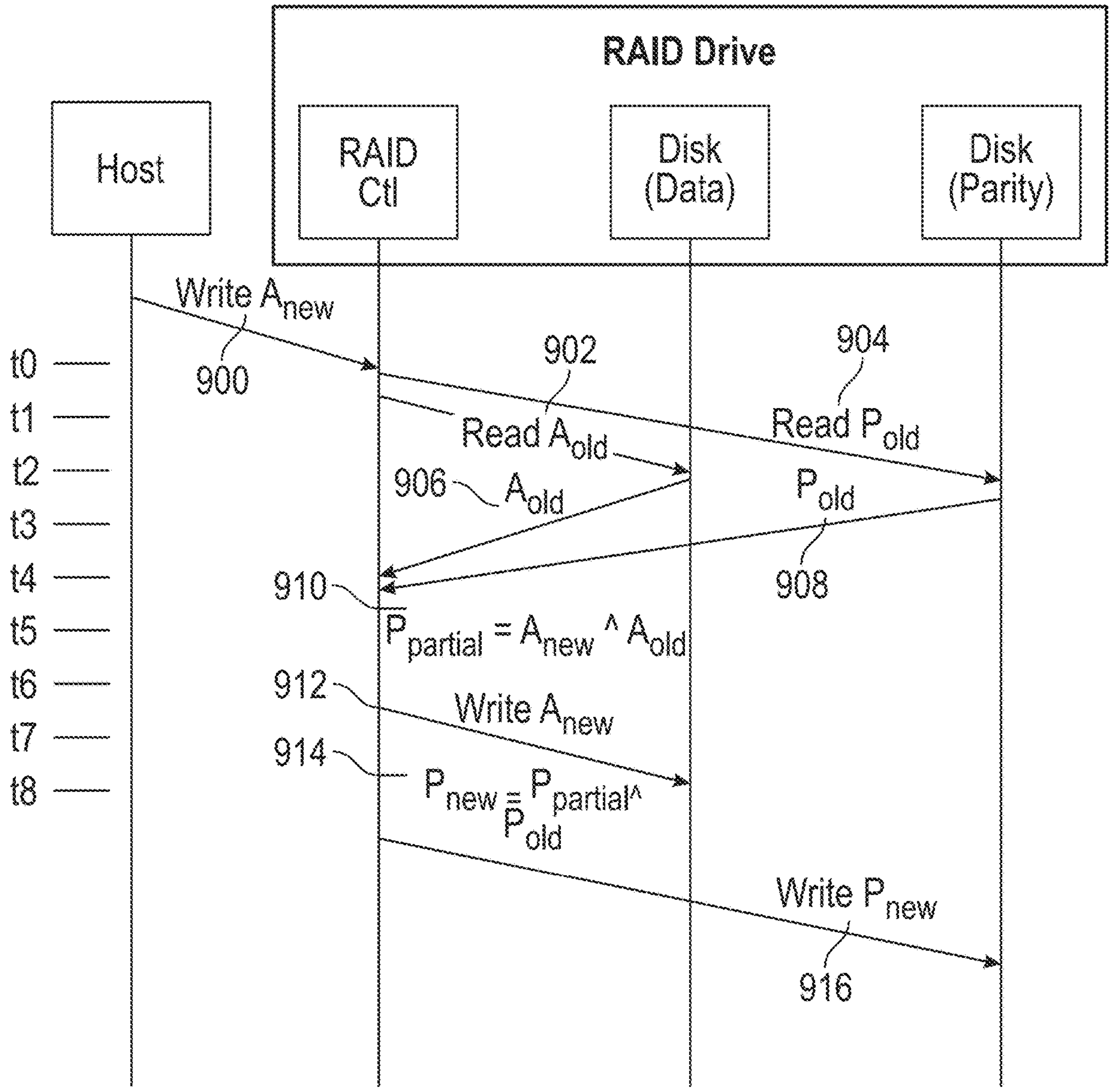
FIG. 9 is an example illustration of a process and interactions in a centralized RAID system when writing a data block to the drive, according to some implementations.

Referring now to FIG. 9, an example illustration of a process and interactions in a centralized RAID system when writing a data block to the drive, according to some implementations. At time t0, the host transmits a write request for $A_{new}$ to the RAID controller (900). At time t1, the RAID controller issues a read request to the disk storing the old data, $A_{old}$ (902). At time t2, the disk retrieves $A_{old}$ and transmits it back to the RAID controller (906). At time t3, the RAID controller reads the old parity block $P_{old}$ from the parity disk (904). At time t4, the disk transmits $P_{old}$ back to the RAID controller (908). At time t5, the RAID controller computes a partial parity block $P_{partial}$ by XORing $A_{new}$ and $A_{old}$ (910). At time t6, the RAID controller writes $A_{new}$ to the disk (912). At time t7, the RAID controller computes the new parity block $P_{new}$ by XORing $P_{partial}$ and $P_{old}$ (914). At time t8, the RAID controller writes $P_{new}$ to the parity disk (916), completing the write operation. This sequence highlights the centralized processing of RAID, which introduces additional latency due to multiple sequential read and write operations.

Figure 10:
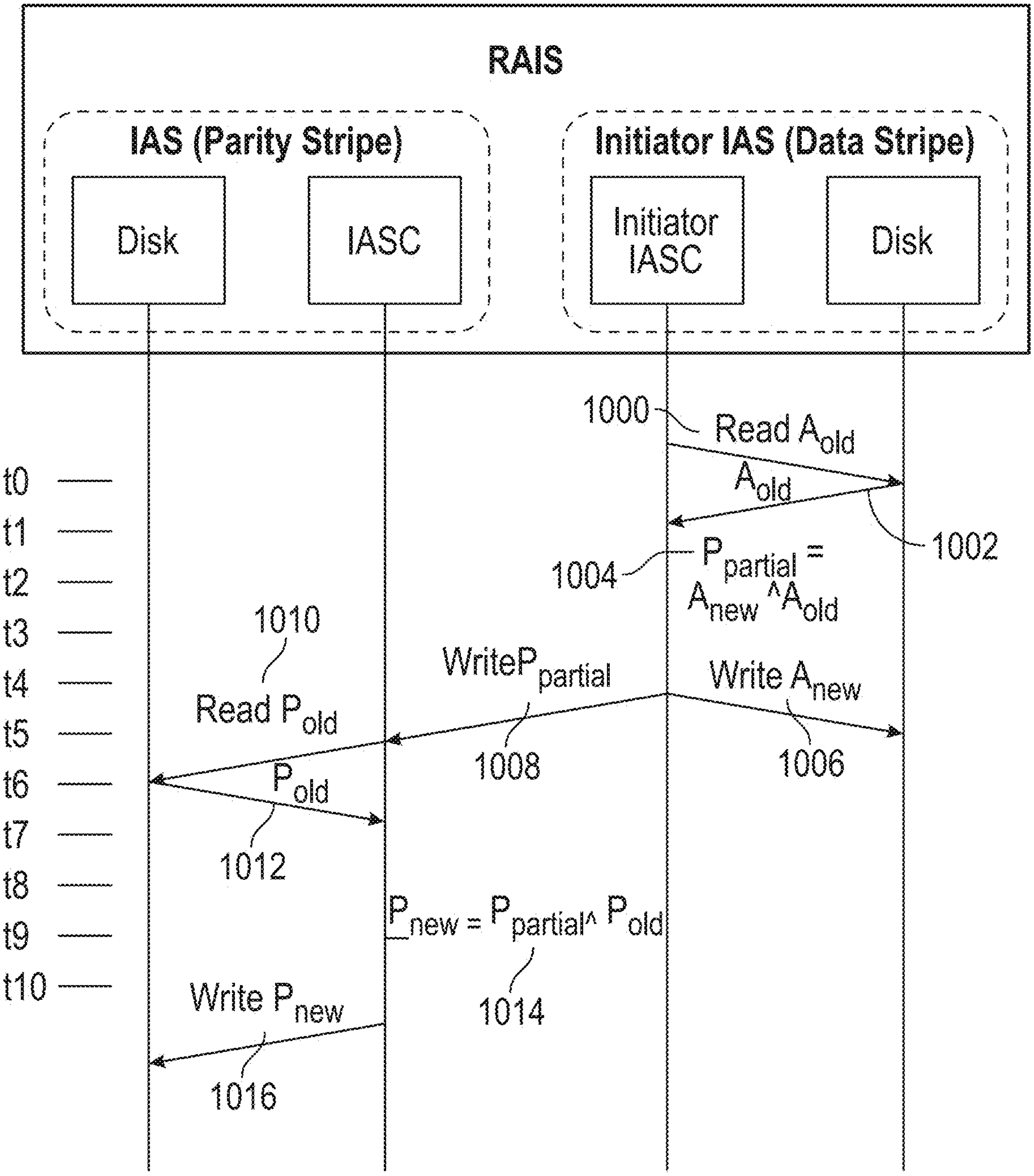
FIG. 10 is an example illustration of a process and interactions in a RAIS system when writing a data block to the drive, according to some implementations.

Referring now to FIG. 10, an example illustration of a process and interactions in a RAIS system when writing a data block to the drive, according to some implementations. At time to, the initiator IAS transmits a read request for the old data, $A_{old}$, to the disk storing it (1000). At time t1, the disk retrieves $A_{old}$ and sends it back to the initiator IAS (1002). At time t2, the initiator IAS computes a partial parity block $P_{partial}$ by XORing $A_{new}$ and $A_{old}$ (1004). At time t3, the initiator IAS writes $A_{new}$ to the disk (1006). At time t4, the initiator IAS transmits $P_{partial}$ to the IAS storing the corresponding parity block (1008). At time t5, the parity IAS retrieves the old parity block $P_{old}$ (1010). At time t6, $P_{old}$ is transmitted to the parity IAS controller (1012). At time t7, the parity IAS computes the new parity block $P_{new}$ by XORing $P_{partial}$ and $P_{old}$ (1014). At time t8, the parity IAS writes $P_{new}$ to the parity disk (1016), completing the write operation. This distributed approach allows RAIS to perform write operations in parallel across multiple IAS systems, reducing bottlenecks and improving performance compared to centralized RAID.

Figure 11:
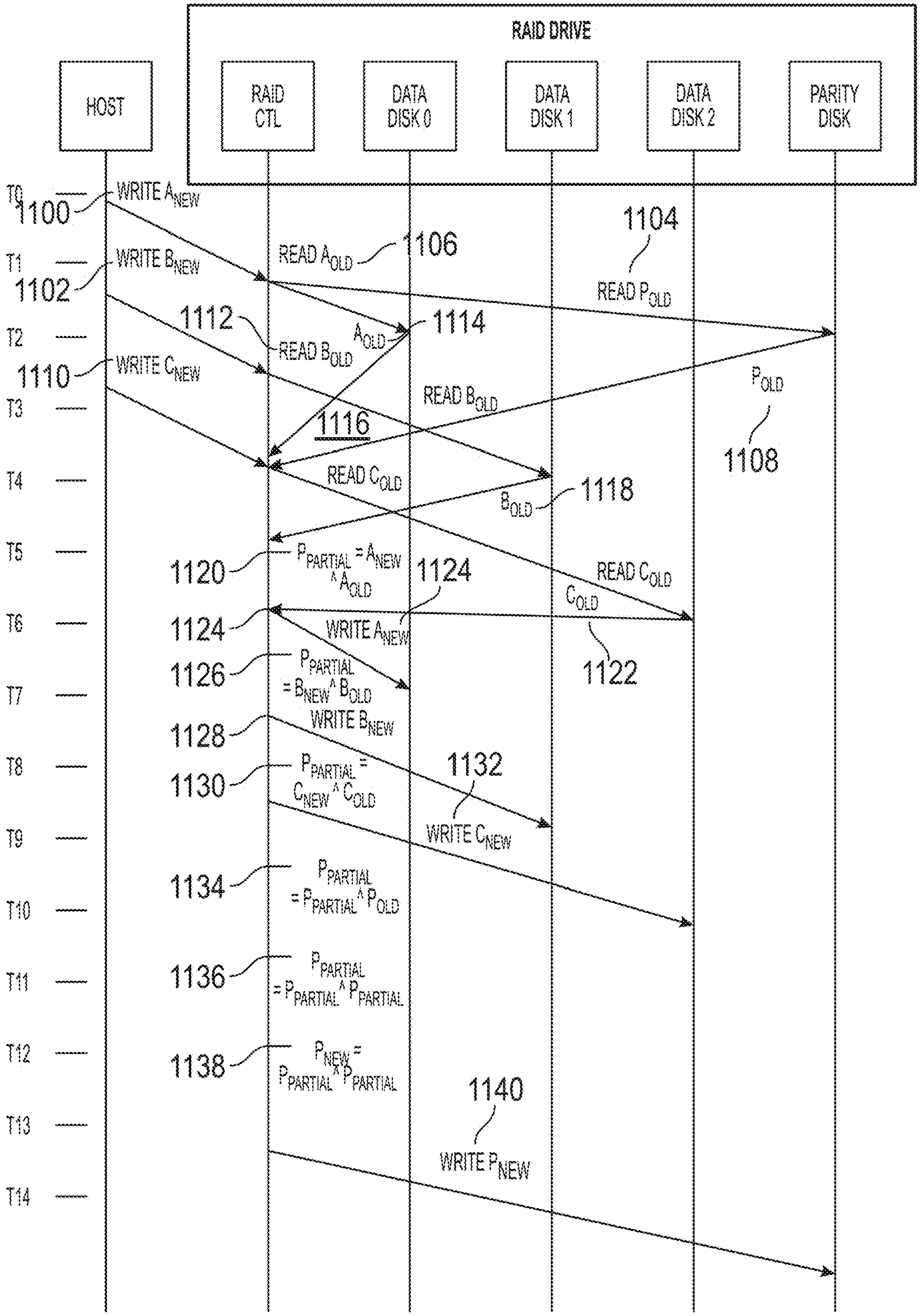
FIG. 11 is an example illustration of interactions between the components of a centralized RAID system when writing multiple data block stripes to separate drives and computing parity, according to some implementations.

Referring now to FIG. 11, an example illustration of interactions between the components of a centralized RAID system when writing multiple data block stripes to separate drives and computing parity, according to some implementations. At time to, a host transmits a write command for a new data block $A_{new}$ (1100) to the RAID controller, followed by (at t1 and t2) write commands for additional data blocks $B_{new}$ (1102) and $C_{new}$ (1110). The RAID controller retrieves the old data blocks and the existing parity block. At t1, the RAID controller issues a read command for $A_{old}$ (1106) to data disk 0 At t2, the RAID controller issues a read command for $B_{old}$ (1112) to data disk 1. At t4, the RAID controller issues a read command for $C_{old}$ (1116) to data disk 2. Additionally, at t1, the RAID controller sends a read command for the old parity block $P_{old}$ (1104) to the parity disk.

The requested blocks are returned to the RAID controller. Specifically, $A_{old}$ is retrieved from data disk 0 (1114), $B_{old}$ is retrieved from data disk 1 (1118), $C_{old}$ is retrieved from data disk 2 (1122), and $P_{old}$ is retrieved from the parity disk (1108). At t5, a partial parity $P_{partial}$ is computed using an XOR operation between $A_{new}$ and $A_{old}$ (1120). At t6, the RAID controller issues write command for $A_{new}$ to data disk 0 (1124). At t7, a $P_{partial}$ is computed for $B_{new}$ using XOR with $B_{old}$ (1126), and at t8, another $P_{partial}$ is computed for $C_{new}$ using XOR with $C_{old}$ (1130). These partial parity values are then sequentially XORed with $P_{old}$ (1134, 1136) to generate the final parity block $P_{new}$ (1138). At t14, the RAID controller writes the computed $P_{new}$ (1140) to the parity disk, completing the write operation. As shown, FIG. 11 illustrates the traditional RAID architecture that rely on a centralized RAID controller.

Figure 12:
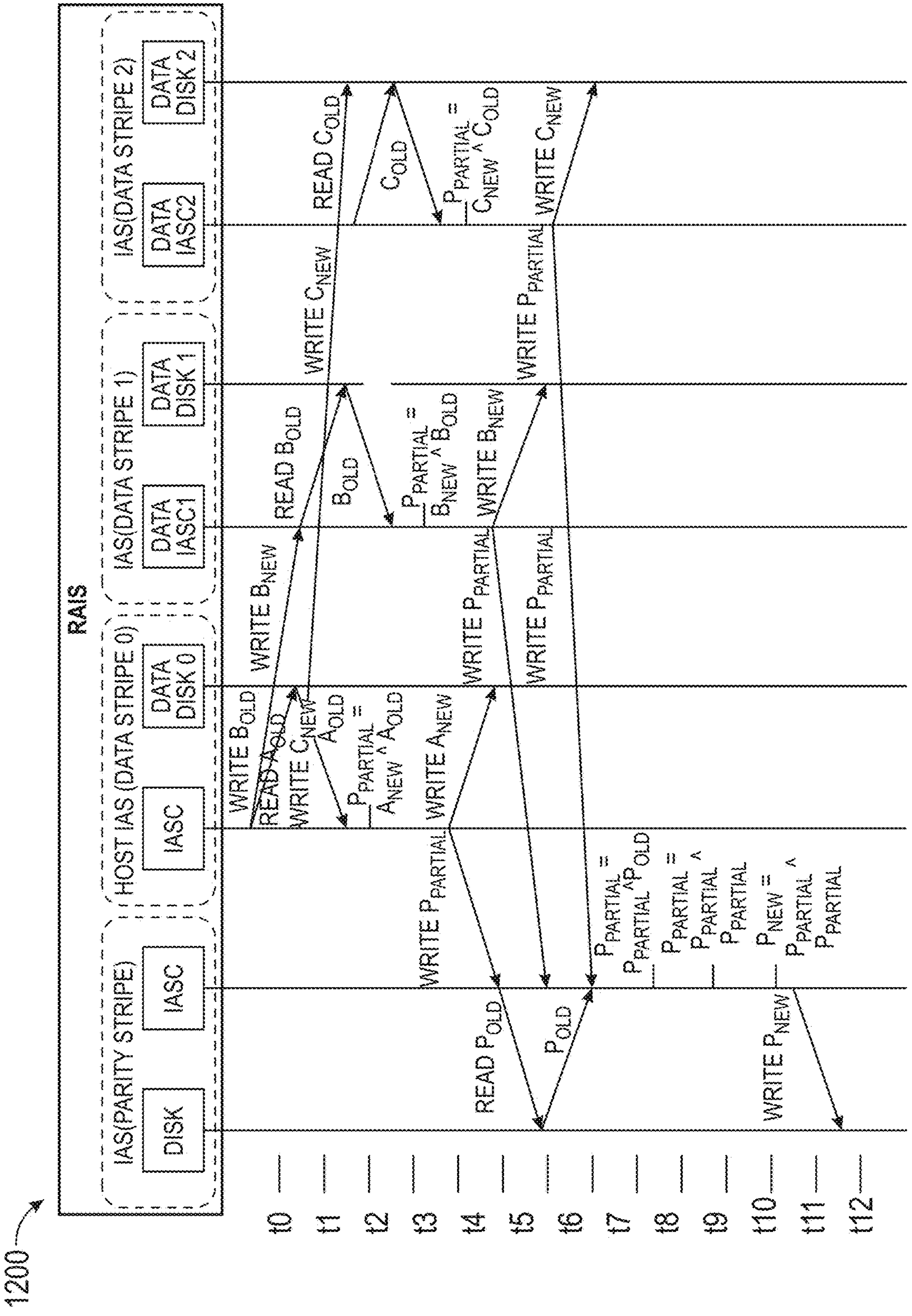
FIG. 12 is an example illustration of interactions between the components of a RAIS system when writing multiple data block stripes to separate IAS units and recomputing the parity block across distributed storage, according to some implementations.

Referring now to FIG. 12, an example illustration of interactions between the components of a RAIS system when writing multiple data block stripes to separate IAS units and recomputing the parity block across distributed storage, according to some implementations. A sequence 1200 can begin when the host IAS transmits write and/or read commands containing new data blocks to their respective IAS storage controllers. Each IAS receiving a write command identifies the storage block address corresponding to the logical block address of the new data block and determines the associated parity stripe. Before updating the storage block, each IAS can generate a read request directed to the associated data disk to retrieve the old data block stored at that address. The read requests propagate through the respective IAS storage controllers, which interface with the data disks to access and retrieve the old data values. Upon receiving the old data blocks, each IAS can perform an XOR operation between the new data block and the retrieved old data block to compute a partial parity block. The IAS storage controllers can transmit the computed partial parity blocks to the IAS responsible for parity storage within the stripe. Concurrently, each IAS can issue a write request to store the new data block in the corresponding data disk at the computed storage block address.

In some implementations, the IAS storing the parity data receives multiple partial parity blocks corresponding to the modified data blocks within the stripe. It can issue a read request to the parity storage to retrieve the old parity block associated with the stripe. Once retrieved, the parity storage controller can execute an XOR operation between the old parity block and the received partial parity blocks to compute the final parity value. The updated parity block can be written to the parity storage location within the distributed RAIS set. Additionally, each IAS can perform these operations in parallel, executing distributed storage updates and parity recalculations asynchronously across the RAIS system. Unlike traditional RAID architectures that rely on a centralized RAID controller to handle data and parity operations sequentially, the RAIS system and the sequence 1200 can distribute these computations across multiple IAS systems, reducing processing latency and eliminating a single bottleneck in parity updates. The interfaces of the storage controller with their respective data and parity storage blocks, improving throughput by processing independent write operations simultaneously. The distributed parity update can reduce contention and read-modify-write cycles by asynchronously coordinating parity updates across multiple IAS systems.

Additionally, the same operation performed in FIG. 11 can be performed by the RAIS in FIG. 12. In this implementation, the drive to store $A_{new}$, which can be identified as data stripe 0, resides on the initiator IAS. While drives for $B_{new}$ and $C_{new}$, resides on different IAS1 (data stripe 1) and IAS2 (data stripe 2) respectively. Similar to FIG. 10, the initiator IAS reads the $A_{old}$ from its local drive. At the same time, it writes $B_{new}$ to IAS1. In some implementations, if there is only one connection to the network, the initiator writes $C_{new}$ to IAS2 after completing $B_{new}$. Additionally, each IAS can now work in parallel to compute the partial parities. In the initiator IAS, the drive returns $A_{old}$ to the IAS. The partial parity for A, $P_{partial_A}$, is then computed as an XOR of $A_{new}$ and $A_{old}$. $A_{new}$ is then written to the drive. In IAS1 and IAS21, the same procedure can be performed. The $B_{old}$ and $C_{old}$ are read from their corresponding drives. The old data returned to the IAS, which can be XORed to the new value to compute the partial parities $P_{partial_B}$ and $P_{partial_C}$. The new data can then be written to their respective drive.

The new parity $P_{new}$ can be computed by IAS where the parity block resides. The initiator IAS, IAS1 and IAS2 send their computed partial parities $P_{partial_A}$, $P_{partial_B}$, and $P_{partial_C}$, to the parity stripe IAS. The parity IAS reads the old parity, from its drive. $P_{old}$ is returned to the IAS. The first partial parity, $P_{partial_0}$, is computed by XORing $P_{partial_A}$ and $P_{new}$. The second partial parity, $P_{partial_1}$, is computed by XORing $P_{partial_0}$ and $P_{partial_B}$. Finally, the new parity, $P_{new}$, is computed by XORing $P_{partial_1}$ and $P_{partial_C}$ which is then written back to the drive. The process completes at time t12.

In some implementations, by stripping the data across plurality of IASs, another layer of reliability is introduced. If any one of the IAS crashes, another IAS can be inserted and the data from the old IAS can be fully recovered. As compared to a single centralized RAID controller where this is a single point of failure, if the RAID controller fails, the entire logical drive is lost. The status of the RAIS drive can be reported through the Distributed RAID Management Application (DRMA). A notification can be sent through the DRMA indicating when any of the IAS fails. The faulty IAS can then be replaced by a new system. From the DRMA, there is an option to perform data recovery. Additionally, each IAS can maintain a plurality of spare blocks in its local drive physical address space. These spare blocks can be used to replace bad blocks that can occur eventually due to repeated program and erase cycles. When a bad block is detected, the IAS firmware (e.g., IASD) can remap the logical address of that block into one of the available spare blocks. Since a plurality of drives can be connected into one IAS, it can map a bad block in one drive into a spare block that resides on another.

In some implementations, the lost data can be recovered by performing XOR operations between the good data blocks and their corresponding parity. Whenever there is a bad block, it can be remapped into one of the reserved blocks that reside in the same IAS. This process can be referred to as partial IAS recovery. When the number available spare blocks fall below a pre-determined threshold, a warning is issues to the RAIS administrator for maintenance actions. When all and/or some of the reserved blocks are used up, and new unrecoverable error occurs, then the IAS system can be replaced. This process is called full IAS recovery. For example, an RAIS system can include a spare IAS, so a self-healing action can be taken when a full IAS recovery is needed.

Figure 13:
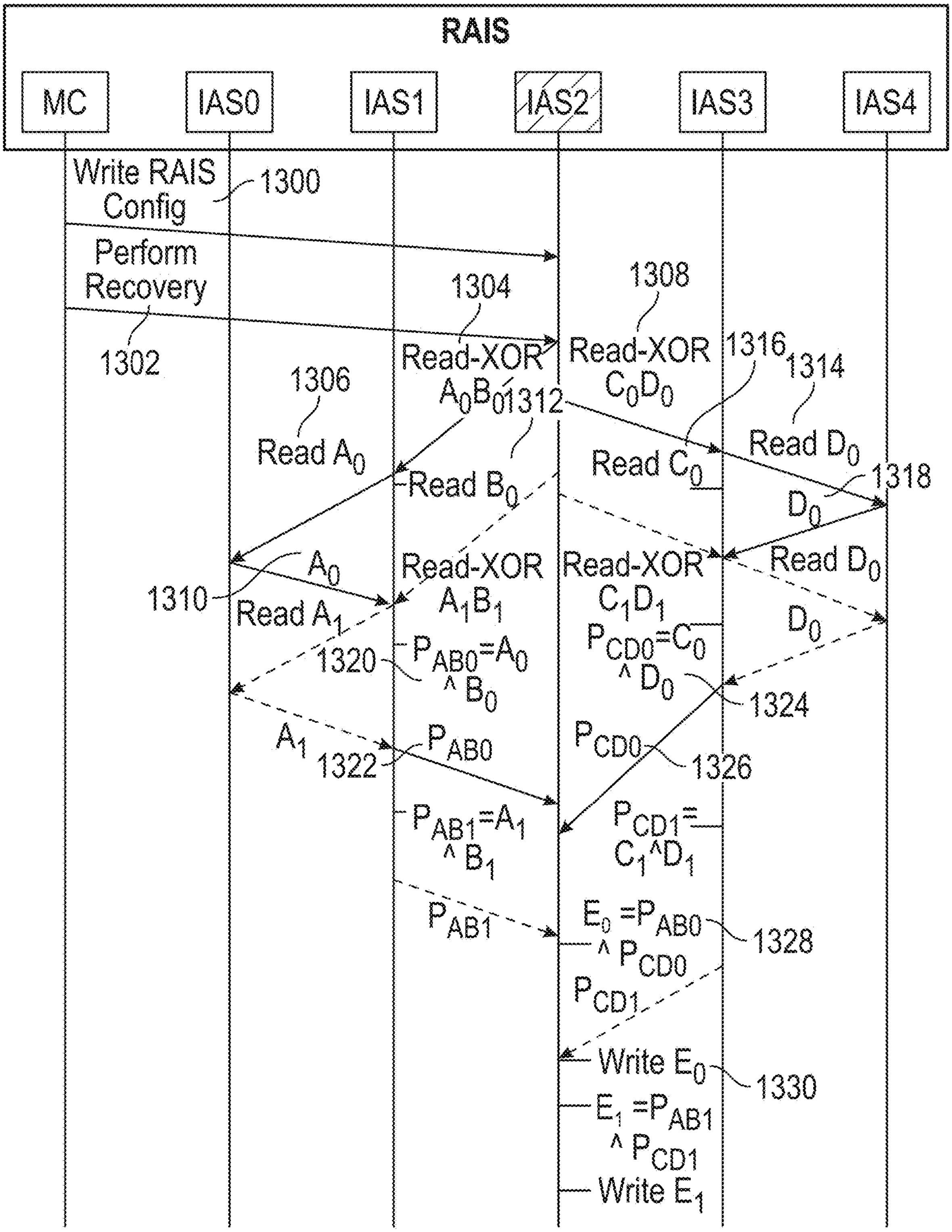
FIG. 13 is an example illustration of a RAIS recovery process across multiple IAS systems, using distributed parity computations to reconstruct missing data, according to some implementations.

Referring now to FIG. 13, an example illustration of a RAIS recovery process across multiple IAS systems, using distributed parity computations to reconstruct missing data, according to some implementations. The management controller (MC) first writes the RAIS configuration (1300) and initiates the recovery process (1302). IAS2 sends a Read-XOR $A_0B_0$ request (1304) to IAS1, which responds by retrieving data block $A_0$ from IAS0 storage (1306) and transmitting it back to IAS1 (1310). Simultaneously, IAS1 reads data block $B_0$ from its own storage (1312). Meanwhile, IAS2 sends a Read-XOR $C_0D_0$ request (1308) to IAS3. IAS3 then retrieves data block $D_0$ and forwards a Read $D_0$ request (1314) to IAS4, which responds by returning $D_0$ (1318). Additionally, IAS2 reads $C_0$ directly from its own storage (1316).

In some implementations, after the initial data retrieval, IAS2 can send additional requests: Read-XOR $A_1B_1$ to IAS1 and Read-XOR $C_1D_1$ to IAS3. In response, IAS1 computes parity $P_{AB_0}=A_0$ XOR $B_0$ (1320), and IAS3 computes parity $P_{CD_0}=C_0$ XOR $D_0$ (1324). IAS1 then returns $P_{AB_0}$ to IAS2 (1322), and IAS3 returns $P_{CD_0}$ to IAS2 (1326). With both parity values received, IAS2 computes the final error correction block $E_0=P_{AB_0}$ XOR $P_{CD_0}$ (1328). Additionally, IAS2 can continue to retrieve additional parity values: $P_{AB_1}$ from IAS1 and $P_{CD_1}$ from IAS3. Using these, IAS2 computes $E_0=P_{AB_1}$ XOR $P_{CD_1}$ at (1330). The final correction blocks $E_0$ and $E_1$ are then written back to persistent storage at (1330) and a subsequent step, providing data redundancy is restored across the RAIS system. That is, the computed correction blocks $E_0$ and $E_1$ reconstruct the missing or corrupted data using distributed parity values across multiple IAS systems (e.g., even if individual storage nodes fail the original data can still be recovered). By retrieving parity values $P_{AB_0}$, $P_{CD_0}$, $P_{AB_1}$, and $P_{CD_1}$ from separate IAS systems and performing XOR operations, the system distributes redundancy across multiple storage locations, preventing data loss due to localized failures. The final write operations can verify that the newly computed parity blocks are stored in persistent storage.

Additionally, FIG. 13 depicts an example of a full IAS data recovery operation. A new unit, IAS2, can be inserted into the system. From the MC, using the DRMA, the system administrator initiates a data recovery of a RAIS set containing 5 stripes, IAS0 to IAS4. The first step in the data recovery is for the MC to write the configuration file (1300) to the new IAS unit. For example, this can a copy of the configuration file that the replaced unit had. The MC can now send the data recovery command (1302) to IAS2. For any block address, IAS2 can derive which IAS and block addresses to read from and XOR with each other to calculate for the lost data starting with first block, E0, IAS2 sends a Read-XOR command (1304) to IAS1, which is a command between IAS for performing data recovery. This command contains two block addresses A0 and B0, which the IAS1 read and XOR with each other. IAS1 identifies that A0 resides in another IAS, so it sends a read command (1306) to IAS0. IAS0 then returns A0 (1310) to IAS1. For B0, IAS1 identifies that it resides locally, so it performs a read (B0) into one of its drives. When A0 and B0 are both available, the partial parity PAB0, is computed by XORing A0 and B0 (1320). $P_{AB_0}$ is returned to IAS2.

While Read-XOR command is being performed by IAS1, IAS2 sends another Read-XOR to IAS3 in parallel (1308), this time for reading C0 (1316) and D0 (1314), and XORing (1324) together to get $P_{CD_0}$ (1326). When both $P_{AB_0}$ and $P_{CD_0}$ are received by IAS2, the first block, E0, can now be computed by XORing $P_{AB_0}$ and $P_{CD_0}$ (1328). Finally, the result is written to the first block address (1330). The same steps, 1304 to 1330 are repeated for the next block until all blocks are recovered. The block recovery process is performed in pipeline, which means that the Read-XOR command for the next block can be sent even if the current one is not yet complete.

Additionally, from the MC, using the DRMA, the system can initiate a data recovery of a RAIS set containing 5 stripes, IAS0 to IAS4. The first step in the data recovery is for the MC to write the configuration file to the new IAS unit. This can be a copy of the configuration file that the replaced unit had. The MC can now send the data recovery command to IAS2. In some implementations, for any block address, IAS2 can derive which IAS and block addresses to read from and XOR with each other to calculate for the lost data starting with first block, $E_0$, IAS2 sends a Read-XOR command to IAS1, which can be a special command between IAS for performing data recovery. This command can contain two block addresses $A_0$ and $B_0$, which the IAS1 can read and XOR with each other. IAS1 identifies that $A_0$ resides in another IAS, so it sends a read command to IAS0. IAS0 then returns $A_0$ to IAS1. For $B_0$, IAS1 identifies that it resides locally, so it performs a read ($B_0$) into one of its drives. When $A_0$ and $B_0$ are both available, the partial parity $P_{AB_0}$, can be computed by XORing $A_0$ and $B_0$. $P_{AB_0}$ can be returned to IAS2.

While Read-XOR command is being performed by IAS1, IAS2 sends another Read-XOR to IAS3 in parallel, this time for reading $C_0$ and $D_0$, and XORing together to get $P_{CD_0}$. When both $P_{AB_0}$ and $P_{CD_0}$ are received by IAS2, the first block, E0, can now be computed by XORing $P_{AB_0}$ and $P_{CD_0}$. The result can be written to the first block address. The same steps, 1304 to 1330 can be repeated for the next block until all necessary blocks are recovered. The block recovery process can be performed in pipeline (e.g., the Read-XOR command for the next block can be sent even if the current one is not yet complete).

Figure 14:
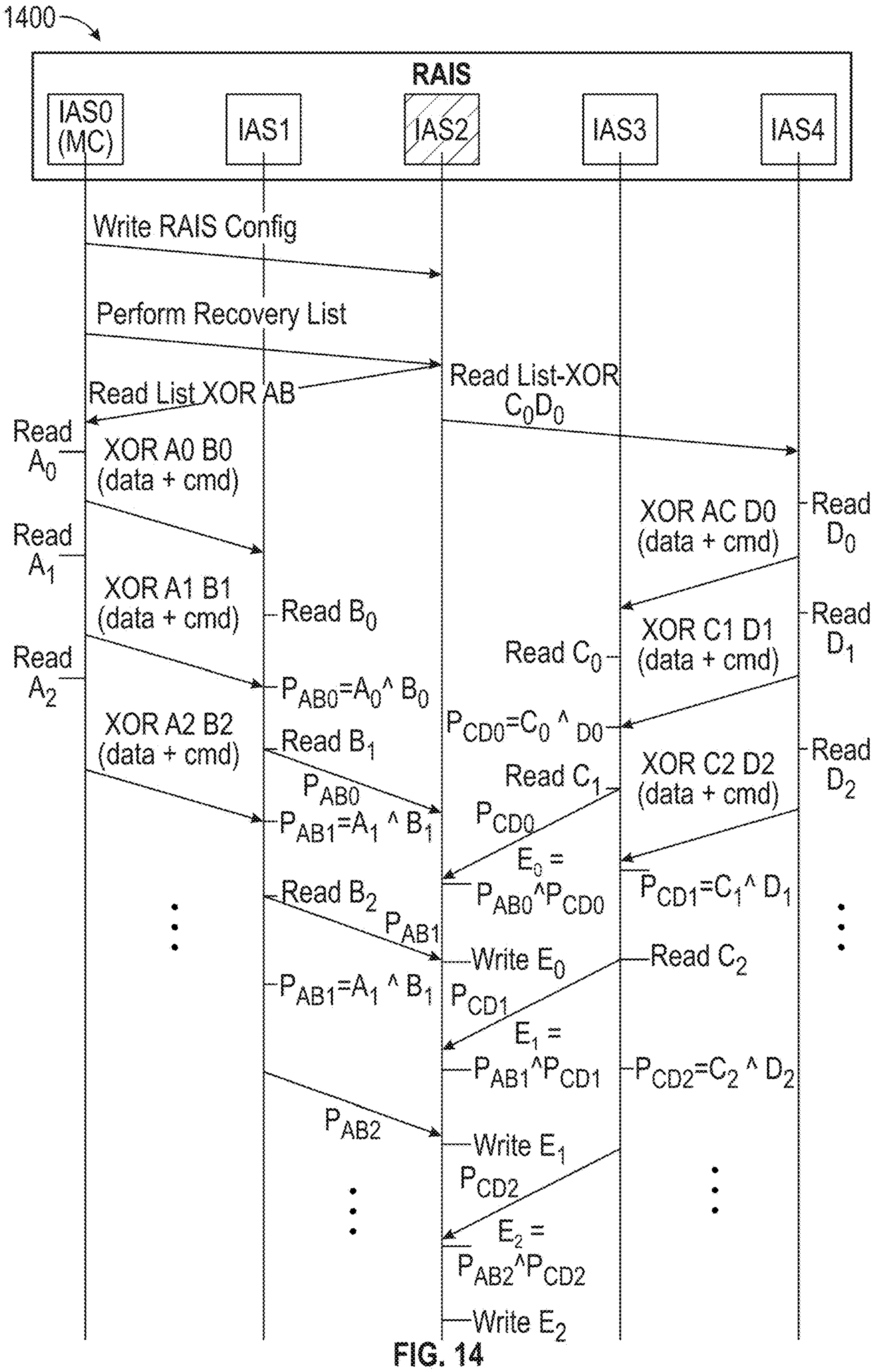
FIG. 14 is an example illustration of interactions between the components of a RAIS system when reconstructing lost data using a structured recovery list across distributed IAS systems, according to some implementations.

Referring now to FIG. 14, an example illustration of interactions between the components of a RAIS system when reconstructing lost data using a structured recovery list across distributed IAS systems, according to some implementations. A sequence 1400 can begin when the management IAS transmits a structured recovery list containing identifiers of missing or corrupted data blocks and their associated parity groups to the participating IAS systems. Each IAS receiving the recovery list determines which missing data blocks correspond to its assigned storage and issues read requests to retrieve associated parity blocks and surviving data blocks required for reconstruction. The read requests propagate through the respective IAS storage controllers, which interface with the data disks to access and retrieve the existing parity and data values. Upon receiving the necessary data, each IAS can execute XOR operations to reconstruct intermediate parity values corresponding to missing data blocks.

In some implementations, the IAS systems that reconstruct the missing data blocks compute successive parity values iteratively. Each IAS storing surviving data can contribute parity values derived from XOR operations on its stored data blocks. These parity results propagate through the distributed system, where additional IAS systems combine them with further retrieved data and parity blocks to reconstruct final missing values. The reconstructed data blocks can be written back to persistent storage at the computed locations (e.g., data redundancy can be restored across the RAIS system). Unlike traditional RAID architectures that rely on a centralized RAID controller for data recovery, the RAIS system and the sequence 0100 can distributes the recovery process across multiple IAS systems, reducing recovery latency and eliminating single bottlenecks. The capability to execute recovery operations in parallel improves fault tolerance by leveraging multiple IAS storage nodes to execute independent portions of the reconstruction sequence.

Additionally, still referring to FIG. 14, sequence 1400 depicts another variant of the data recovery operation, where there is less command and data movement between the IASs. Another command can be introduced, READ-LIST-XOR, which can be a command that performs read and XOR for a list of addresses. In this example, the MC can also be one of the IAS in the RAIS set, which is IAS0. Initially, IAS0 can write the RAIS configuration to IAS2, followed by a data recovery command. IAS2 can then send a READ-LIST-XOR command to IAS0, indicating that the address of stripe A and B must be XORed together and returned to IAS2. From the address, IAS0 knows that the address of stripe A resides in its local drive, so it reads the first address A0. Then IAS0 sends an XOR $A_0B_0$ to IAS1 which provides the data for A0 and tells IAS1 to read the first address of stripe B and XOR it with A0 to compute for partial parity $P_{AB_0}$ which will then be sent back to IAS2. In parallel, another READ-LIST-XOR is sent to IAS4, this time to perform read and XOR for stripes C and D. When IAS2 receives $P_{AB_0}$ and $P_{CD_0}$, they are XORed together to get the recovered data $E_0$, which can be written to the drive.

With the READ-LIST-XOR command, one command can be sent to IAS0 and IAS4, then the rest of the data recovery process can be automatically performed by the IAS systems to compute the for $E_0$, $E_1$ until the last address EN. A READ-LIST-XOR can contain one or more list of addresses to be recovered. That is, each IAS can include a plurality of I/O controllers and ports that connect to a network. These serve as a redundancy path to the RAIS system. If any of these connections fails, the RAIS system can still operate using the other I/O port.

Referring now to FIG. 15, a block diagram illustrating an example of mapping logical block addresses (LBAs) to storage block addresses (SBAs) across multiple IAS systems in a RAIS set 1500, according to some implementations. That is, FIG. 15 illustrates a storage configuration where a plurality of IAS systems store both data blocks and distributed parity blocks (e.g., across a plurality of storage block addresses in a local storage and/or remote storage). The control local address (Ctl Local Addr) can define the logical block address (LBA) offset relative to each IAS system. The IAS systems (e.g., IAS 0, IAS 1, IAS 2, IAS 3, and IAS 4) store the corresponding SBAs and parity blocks, where each row can represent a stripe across multiple IAS systems. For example, SB0 corresponds to B0 stored in IAS 1, SB1 corresponds to B1 stored in IAS 2, and so on. In another example, SB5 corresponds to B4 stored in IAS 0, and R1 is stored in IAS 1, where R1 is a parity block computed based on an XOR operation across the data blocks in the stripe.

In some implementations, the mapping function for determining the storage block address (SBA) of a data block can be represented by Equation 1.

$$SBA_{data} = (B + 1) + \left(\frac{B}{\text{stripe}_{count}}\right)$$

where B is the logical block address and the stripe count determines the number of IAS systems in a stripe. For example, SB1:B0 can be mapped to IAS 1 and SB2:B1 can be mapped to IAS 2. The stripe ID can be determined using Equation 2.

$$\text{stripe}_{ID} = SBA \ \% \ \text{stripe}_{count}$$

For example, if the stripe count is 5, and SBA=12, then:

$$12 \bmod 5 = 2$$

indicating that this block is assigned to IAS 2 in the corresponding stripe.

In some implementations, parity blocks, labeled as R(X), can be distributed across multiple IAS systems. The SBA of a parity block can be determined by Equation 4.

$$SBA_{parity} = (SBA_{data} - (SBA_{data} \ \% \ \text{stripe}_{count})) + \text{stripe}_{1D}$$

For example, the parity block R5 can be stored in IAS 0 and corresponds to the XOR of B20, B21, B22, and B23 from the same row. In some implementations, when new data is written, a partial parity can be determined by:

$$\text{Partial Parity} = B_{new} \oplus B_{old}$$

with updated parity block determined by:

$$R_{new} = R_{old} \oplus \text{Partial Parity}$$

For example, if B22 is updated with new data B22', the partial parity can be computed using the old data B22 and the new data B22'. Then, the old parity R5 can be updated using the partial parity to generate the new parity R5'. The updated data and parity can be stored at respective storage locations.

Referring now to FIG. 16, a block diagram illustrating the mapping of data blocks and parity blocks across multiple IAS systems (IAS 0-IAS 9), depicting the relationship between multiple RAIS sets 1600 and stripe configurations, according to some implementations. The first column (CTL LOCAL ADDR) can represent the storage block addresses within each IAS. Each stripe can be identified within each IAS column (IAS 0-IAS 9), where data blocks and parity blocks can be assigned to balance storage and computational load. Each RAIS set (1602, 1604, 1606, and 1608) can be assigned a subset of IAS systems, defining independent sets of distributed redundancy.

In some implementations, RAIS SET 0 (1602) spans IAS 0 to IAS 4, where data blocks and parity blocks are striped across these IAS systems. Each stripe can contain a subset of the data stored within RAIS SET 0 (1602). The RAIS mapping function can determine the distribution of storage blocks. The mapping of a logical block address (LBA) to a storage block address (SBA) within RAIS SET 0 (1602) can be computed using Equation 1. For example, SB0:B0 can be mapped to IAS 1, SB2: B1 to IAS 2, and so forth. Similarly, RAIS SET 1 (1604) can include IAS 6 to IAS 9, providing another independent storage grouping with its own distributed data and parity blocks. The system ensures that each RAIS set (1602, 1604, 1606, and 1608) maintains redundancy across multiple IAS systems to facilitate recovery in case of failure.

In some implementations, the IAS ID where a data block is stored can be determined using Equation 3a. For example, if SBA=25 and the stripe count is 5, then:

$$IAS_{ID} = \left((25\%5) + \text{start}_{IAS_{ID}}\right)\% \ IAS_{count}$$

since 25 mod 5=0, the equation can be:

$$IAS_{ID} = \text{start}_{IAS_{ID}} \ \% \ IAS_{count}$$

$$IAS_{ID} = 2 \bmod 10 = 2$$

ensuring that SBA 25 is mapped to IAS 2.

RAIS SET 2 (1606) and RAIS SET 3 (1608) extend the distributed data storage. In each RAIS set, the stripe assignments can define which IAS systems participate in each stripe. The parity block distribution across RAIS SET 0 (1602), RAIS SET 1 (1604), RAIS SET 2 (1606), and RAIS SET 3 (1608) can ensure that parity is not stored in a single IAS system but rather distributed among the IAS systems within the set. The storage block address of a parity block can be determined using Equation 5. When reconstructing a missing data block, the IAS system(s) can:

$$B_{missing} = R_{parity} \oplus B_{surviving_1} \oplus B_{surviving_2} \oplus \ldots$$

For example, if SB12:B9 in RAIS SET 1 (1604) is lost, it can be reconstructed using R2 along with surviving data blocks SB11:B8 (IAS 1), SB13:B10 (IAS 3), and SB14:B11 (IAS 4). By structuring data and parity across RAIS SET 0 (1602), RAIS SET 1 (1604), RAIS SET 2 (1606), and RAIS SET 3 (1608), the IAS system(s) ensures efficient load balancing, parallel processing, and/or redundancy, addressing technical limitations found in traditional RAID systems.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes can be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the principles defined herein can be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and can be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In some exemplary examples, the functions described can be implemented in hardware, software, firmware, or any combination thereof. If implemented in software, the functions can be stored as one or more instructions or code on a non-transitory computer-readable storage medium or non-transitory processor-readable storage medium. The steps of a method or algorithm disclosed herein can be embodied in a processor-executable software module which can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable storage media can include RAM, ROM, EEPROM, FLASH memory, CD-ROM or other optical drive storage, magnetic drive storage or other magnetic storages, or any other medium that can be used to store desired program code in the form of instructions or data structures and that can be accessed by a computer. Drive and disc, as used herein, includes compact disc (CD), laser disc, optical disc, digital versatile disc (DVD), floppy drive, and Blu-ray disc where drives usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable storage medium and/or computer-readable storage medium, which can be incorporated into a computer program product.

The preceding description of the disclosed examples is provided to enable any person skilled in the art to make or use the present disclosure. Various modifications to these examples will be readily apparent to those skilled in the art, and the generic principles defined herein can be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. An integrated atomic server (IAS) system, comprising:

a local array of drives configured to store a plurality of data blocks and at least one configuration data structure comprising at least one mapping function for at least one logical block address; and a first controller configured to:

perform, with a plurality of IAS systems, a plurality of operations to maintain distributed redundancy across the plurality of IAS systems, wherein performance of at least two of the plurality of operations occurs in parallel, the plurality of operations comprising at least:

transmitting, via a high-speed interconnect using an integrated switch, a first sequence of operations to a second controller of a second IAS system to cause the second controller to execute the first sequence of operations on a second plurality of data blocks; and transmitting, in parallel with transmission of the first sequence of operations via the high-speed interconnect using the integrated switch, a second sequence of operations to a third controller of a third IAS system to cause the third controller to execute the second sequence of operations on a third plurality of data blocks;

wherein the IAS system, the second IAS system, and the third IAS system share a distributed data mapping of the plurality of data blocks of the IAS system, the second plurality of data blocks, and the third plurality of data blocks, and wherein the IAS system, the second IAS system, and the third IAS system share a distributed parity mapping of a plurality of parity blocks;

wherein each IAS system of the plurality of IAS systems corresponds to a hot-swappable module plugged into a slot within a chassis and interface via the integrated switch using a corresponding controller.

2. The IAS system of claim 1, wherein:

the first controller is further configured to read at least one data block of the plurality of data blocks mapped to the local array of drives based on the at least one mapping function to determine a physical address and retrieve the at least one data block, and wherein the read is at least one of a plurality of second operations; and the IAS system is configured to synchronize a new IAS system responsive to adding the new IAS system to the chassis, wherein synchronizing comprises performing a plurality of third operations by the first controller with a plurality of controls of the plurality of IAS systems comprising the new IAS system.

3. The IAS system of claim 1, wherein:

the first controller is further configured to read at least one second data block of the second plurality of data blocks on at least one second array of drives of the second IAS system by transmitting a read command to the second IAS system, receiving the at least one second data block in response, and forwarding at least one remote second data block to a requesting application;

the second controller and the third controller execute parity block updates in parallel, each IAS system generating and storing a parity block corresponding to a subset of data blocks assigned by the distributed parity mapping.

4. The IAS system of claim 1, wherein:

the first controller is further configured to write new data to at least one of the plurality of data blocks mapped to the local array of drives by reading an old data block of the plurality of data blocks mapped to the local array of drives, performing an operation on the old data block with the new data to determine a partial parity block, and writing the new data to the local array of drives, and wherein the writing is at least one of a plurality of second operations and is based on the distributed parity mapping of the plurality of parity blocks;

the first controller configured to execute read, write, and recovery operations for the plurality of data blocks and the plurality of parity blocks stored locally and for the second plurality of data blocks, the third plurality of data blocks, and parity blocks stored in at least one remote IAS system connected using the integrated switch, based on the at least one mapping function.

5. The IAS system of claim 1, wherein the first controller is further configured to write new data to at least one of the second plurality of data blocks on at least one second array of drives of the second IAS system by transmitting the new data to the second IAS system, receiving a partial parity block determined by the second IAS system, and performing an operation with an old parity block of the plurality of parity blocks to generate a new parity block, and wherein the operation is at least one of the plurality of operations and is performed based on the distributed data mapping of the plurality of data blocks and the second plurality of data blocks and the distributed parity mapping of the plurality of parity blocks.

6. The IAS system of claim 1, wherein the first controller is further configured to perform data recovery by identifying a plurality of addresses for a plurality of lost data blocks of the plurality of data blocks mapped to the local array of drives or the second plurality of data blocks on at least one second array of drives of the second IAS system and corresponding parity blocks of the plurality of parity blocks using the at least one mapping function, generating a plurality of read commands for the plurality of addresses, receiving a plurality of read data blocks, performing a plurality of operations to reconstruct the plurality of lost data blocks using the plurality of parity blocks and the plurality of read data blocks, and remapping the reconstructed plurality of lost data blocks to a plurality of blocks in the local array of drives, and wherein the plurality of operations are performed based on the distributed data mapping of the plurality of data blocks and the second plurality of data blocks and the distributed parity mapping of the plurality of parity blocks.

7. The IAS system of claim 1, wherein the first controller is further configured to maintain at least one command queue comprising a plurality of priority levels, and to perform a plurality of commands in parallel when writing or reading one of the plurality of data blocks mapped to the local array of drives or one of the second plurality of data blocks on at least one second array of drives of the second IAS system.

8. The IAS system of claim 1, wherein the first controller is further configured to determine or update at least one distributed parity block of the plurality of parity blocks and a second plurality of parity blocks corresponding with one of the plurality of data blocks mapped to the local array of drives or one of the second plurality of data blocks on at least one second array of drives of the second IAS system, and wherein the determination or update is at least one of the plurality of operations, and wherein the at least one distributed parity block is stored in one of the plurality of IAS systems based on the distributed parity mapping of the plurality of parity blocks and the second plurality of parity blocks.

9. The IAS system of claim 1, wherein the IAS system is one of the plurality of IAS systems of a first data group of a plurality of data groups of a redundant array of independent servers (RAIS).

10. A first integrated atomic server (IAS), comprising:

at least one storage device configured to store a plurality of data blocks, a plurality of parity blocks, parity data, and configuration data;

at least one controller configured to perform a plurality of parity operations based on the parity data and perform a plurality of redundant array of independent servers (RAIS) operations based on the configuration data, wherein performance of the plurality of parity operations or the plurality of RAIS operations occurs in parallel, the plurality of parity operations or the plurality of RAIS operations comprising at least:

transmitting, via a high-speed interconnect using an integrated switch, a first sequence of operations to a second controller of a second IAS to cause the second controller to execute the first sequence of operations on a second plurality of data blocks;

transmitting, in parallel with transmission of the first sequence of operations via the high-speed interconnect using the integrated switch, a second sequence of operations to a third controller of a third IAS to cause the third controller to execute the second sequence of operations on a third plurality of data blocks; and at least one network interface configured to transmit and receive, via the high-speed interconnect, the plurality of data blocks to and from at least one second controller of the second IAS and the third controller of the third IAS;

wherein each of the first IAS, the second IAS, and the third IAS corresponds to a hot-swappable module plugged into a slot within a chassis and interface via the integrated switch using a corresponding controller.

11. The first IAS of claim 10, wherein the plurality of RAIS operations comprises at least storing the plurality of data blocks in the at least one storage device and striping a portion of the plurality of data blocks across the second IAS.

12. The first IAS of claim 10, wherein the plurality of RAIS operations comprise at least performing data recovery based on reconstructing at least one missing data block using the plurality of parity blocks and executing distributed parity computations in parallel with the second IAS and the third IAS.

13. The first IAS of claim 10, wherein the plurality of parity blocks comprises at least determining the plurality of parity blocks for a portion of the plurality of data blocks striped across the second IAS and the third IAS.

14. The first IAS of claim 10, wherein the configuration data comprises a plurality of instructions for mapping at least one logical block address (LBA) to at least one location in the at least one storage device or the second IAS.

15. The first IAS of claim 10, wherein the parity data comprises a plurality of data structures comprises a plurality of parity block locations, a plurality of redundancy levels, a plurality of error correction parameters, and a plurality of instructions for reconstructing at least one missing data block using distributed parity computations across the first IAS, the second IAS, and the third IAS.

16. The first IAS of claim 10, wherein the first IAS is one of a plurality of IASs of a first data group of a plurality of data groups of a RAIS.

* * * * *